(12) United States Patent
Whelan et al.

(10) Patent No.: US 9,515,826 B2
(45) Date of Patent: Dec. 6, 2016

(54) NETWORK TOPOLOGY AIDED BY SMART AGENT DOWNLOAD

(75) Inventors: David A. Whelan, Newport Coast, CA (US); Arun Ayyagari, Seattle, WA (US); Gregory M. Gutt, Ashburn, VA (US); Rachel Rane' Schmalzried, San Jose, CA (US)

(73) Assignee: THE BOEING COMPANY, Chicago, IL (US)

( * ) Notice: Subject to any disclaimer, the term of this patent is extended or adjusted under 35 U.S.C. 154(b) by 80 days.

(21) Appl. No.: 13/239,183

(22) Filed: Sep. 21, 2011

(65) Prior Publication Data

US 2012/0222089 A1    Aug. 30, 2012

Related U.S. Application Data

(63) Continuation-in-part of application No. 12/949,404, filed on Nov. 18, 2010.

(51) Int. Cl.
*H04L 9/08* (2006.01)
*H04B 7/185* (2006.01)
(Continued)

(52) U.S. Cl.
CPC ......... *H04L 9/0872* (2013.01); *H04B 7/18593* (2013.01); *H04L 9/3236* (2013.01);
(Continued)

(58) Field of Classification Search
None
See application file for complete search history.

(56) References Cited

U.S. PATENT DOCUMENTS

| | | | |
|---|---|---|---|
| 5,535,278 A | * | 7/1996 | Cahn et al. .................... 380/274 |
| 5,754,657 A | * | 5/1998 | Schipper ................. G01S 19/16 |
| | | | 342/357.29 |

(Continued)

OTHER PUBLICATIONS

Extended European Search Report, Application No. 12182801.6-1853/2573998, Jul. 25, 2013.

(Continued)

*Primary Examiner* — Lisa Lewis
*Assistant Examiner* — Henry Tsang
(74) *Attorney, Agent, or Firm* — Vista IP Law Group LLP; Cynthia A. Dixon

(57) ABSTRACT

A system, method, and apparatus for a network topology aided by a smart agent download are disclosed. The method involves authenticating, with at least one authenticator device, at least one claimant. The method further involves transmitting, by at least one transmission source, the smart agent download to at least one receiving source associated with at least one claimant. In one or more embodiments, at least one transmission source is employed in a Lower Earth Orbiting (LEO) Iridium satellite. Also, the method involves receiving, by at least one receiving source, the smart agent download. In addition, the method involves executing, by at least one processor, the smart agent download. Further, the method involves monitoring, by the smart agent download, network behavior. The monitoring of network behavior includes monitoring the users on the network, monitoring data passing through the network, and monitoring the quantity of data passing through the network.

23 Claims, 12 Drawing Sheets

(51) Int. Cl.
*H04L 9/32* (2006.01)
*H04L 12/26* (2006.01)
*H04L 29/06* (2006.01)
*H04L 29/08* (2006.01)
*H04L 12/24* (2006.01)

(52) U.S. Cl.
CPC ...... *H04L 43/0817* (2013.01); *H04L 43/0876* (2013.01); *H04L 63/08* (2013.01); *H04L 63/107* (2013.01); *H04L 63/1425* (2013.01); *H04L 67/22* (2013.01); *H04L 67/34* (2013.01); *H04L 41/046* (2013.01); *H04L 63/166* (2013.01)

(56) References Cited

U.S. PATENT DOCUMENTS

| | | | |
|---|---|---|---|
| 5,757,916 A * | 5/1998 | MacDoran et al. | 380/258 |
| 6,208,626 B1 * | 3/2001 | Brewer | 370/324 |
| 6,229,479 B1 * | 5/2001 | Kozlov | G01S 19/425 342/357.34 |
| 6,252,917 B1 * | 6/2001 | Freeman | 375/340 |
| 7,042,392 B2 | 5/2006 | Whelan et al. | |
| 7,158,885 B1 * | 1/2007 | Janky | G01S 19/05 701/470 |
| 7,372,400 B2 | 5/2008 | Cohen et al. | |
| 7,468,696 B2 | 12/2008 | Bornholdt | |
| 7,489,926 B2 | 2/2009 | Whelan et al. | |
| 7,554,481 B2 | 6/2009 | Cohen et al. | |
| 7,579,986 B2 | 8/2009 | DiEsposti | |
| 7,579,987 B2 | 8/2009 | Cohen et al. | |
| 7,583,225 B2 | 9/2009 | Cohen et al. | |
| 7,619,559 B2 | 11/2009 | DiEsposti | |
| 7,688,261 B2 | 3/2010 | DiEsposti | |
| 2002/0138632 A1 | 9/2002 | Bade et al. | |
| 2003/0204579 A1 | 10/2003 | Lutz | |
| 2005/0159891 A1 | 7/2005 | Cohen et al. | |
| 2005/0195748 A1 * | 9/2005 | Sanchez | 370/252 |
| 2006/0218267 A1 * | 9/2006 | Khan et al. | 709/224 |
| 2008/0016350 A1 * | 1/2008 | Braskich | H04L 9/0833 713/169 |
| 2008/0059059 A1 | 3/2008 | Cohen et al. | |
| 2008/0143605 A1 | 6/2008 | Bornholdt | |
| 2008/0146246 A1 | 6/2008 | Bornholdt | |
| 2008/0148321 A1 * | 6/2008 | Hane et al. | 725/71 |
| 2008/0250243 A1 * | 10/2008 | Bretheim | H04L 9/3271 713/168 |
| 2008/0293359 A1 * | 11/2008 | Fruit | H04B 7/18515 455/13.3 |
| 2009/0089869 A1 | 4/2009 | Varghese | |
| 2009/0174597 A1 | 7/2009 | DiLellio et al. | |
| 2009/0228210 A1 | 9/2009 | Gutt | |
| 2009/0315764 A1 | 12/2009 | Cohen et al. | |
| 2009/0315769 A1 | 12/2009 | Whelan et al. | |
| 2010/0171652 A1 | 7/2010 | Gutt et al. | |
| 2011/0222589 A1 * | 9/2011 | Howell et al. | 375/213 |

OTHER PUBLICATIONS

Communication Pursuant to Article 94(3) EPC, Application No. 12182801.6—1853, Jul. 22, 2016.

Ali E. Atia, "Ka Band Satellite System Architecture for Local Loop Internet Access", 2001 IEEE MTT-S International Microwave Symposium Digest (IMS 2001), Phoenix, AZ, May 20-25, 2001, [IEEE MTT-S International Microwave Symposium], New York, New York: IEEE, US, May 20, 2001, pp. 1133-1136, vol. 2, XP032405707, DOI: 10.1109/MWSYM.2001.967091, ISBN: 978-0-7803-6538-4.

* cited by examiner

NETWORK TOPOLOGY AIDED BY SMART AGENT DOWNLOAD

CROSS-REFERENCE TO RELATED APPLICATIONS

This application is a Continuation-In-Part application of, and claims the benefit of U.S. patent application Ser. No. 12/949,404, filed Nov. 18, 2010, which is hereby incorporated by reference in its entirety.

BACKGROUND

The present disclosure relates to network topologies. In particular, it relates to network topologies aided by a smart agent download.

SUMMARY

The present disclosure relates to a method, system, and apparatus for a network topology aided by a smart agent download. In particular, the present disclosure teaches a method involving authenticating, with at least one authenticator device, and at least one claimant. The method further involves transmitting, by at least one transmission source, the smart agent download to at least one receiving source associated with at least one claimant. In addition, the method involves receiving, by at least one receiving source, the smart agent download. Additionally, the method involves executing, by at least one processor, the smart agent download. Further, the method involves monitoring, by the smart agent download, network behavior.

In one or more embodiments, at least one authenticator device authenticates at least one claimant. In at least one embodiment, the authentication is performed by evaluating at least one authentication signal. In at least one embodiment, at least one authentication signal is transmitted by at least one transmission source, and is received by at least one receiving source. In some embodiments, at least one authentication signal and the smart agent download are transmitted from the same transmission source. In one or more embodiments, at least one authentication signal and the smart agent download are transmitted from different transmission sources. In at least one embodiment, at least one authentication signal and the smart agent download are transmitted on the same frequency. In some embodiments, at least one authentication signal and the smart agent download are transmitted on different frequencies.

In at least one embodiment, at least one claimant is an entity and/or a user. In one or more embodiments, at least one transmission source is employed in at least one satellite and/or at least one pseudo-satellite. In some embodiments, at least one satellite is a Lower Earth Orbiting (LEO) satellite, a Medium Earth Orbiting (MEO) satellite, and/or a Geosynchronous Earth Orbiting (GEO) satellite.

In one or more embodiments, the disclosed method employs an Iridium LEO satellite constellation, where each of the satellites in the constellation has an antenna geometry that transmits forty-eight (48) spot beams with a distinctive spot beam pattern. In at least one embodiment, at least one authentication signal and/or the smart agent download may be transmitted from at least one of the Iridium satellites in the constellation. The forty-eight (48) spot beams of an Iridium satellite may be used to transmit localized authentication signals and/or signals containing the smart agent download to receiving sources located on or near the Earth's surface. The broadcasted message burst content associated with these signals includes pseudorandom noise (PRN) data. Since a given message burst may occur within a specific satellite spot beam at a specific time, the message burst content including PRN and unique beam parameters (e.g., time, satellite identification (ID), beam identification (ID), time bias, orbit data, etc.) may be used to authenticate the location of the receiving sources. It should be noted that when employing one of the above-described Iridium LEO satellites, the transmission signal power is sufficiently strong enough to allow for the signal to penetrate into an indoor environment reliably, and may employ signal encoding methods in order to do so. This allows for the disclosed method to be used for many indoor applications.

In at least one embodiment, at least one receiving source is employed in a cell phone, a personal digital assistant (PDA), a personal computer, a computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node. In one or more embodiments, the claimant is stationary and/or mobile. In some embodiments, the disclosed method further involves storing the smart agent download in memory. In at least one embodiments, at least one processor and/or the memory is employed in a cell phone, a personal digital assistant (PDA), a personal computer, a computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node.

In one or more embodiments, the monitoring network behavior includes monitoring usage of at least one device associated with at least one claimant, where at least one device is a cell phone, a personal digital assistant (PDA), a personal computer, a computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node; monitoring the location of at least one device associated with at least one claimant; monitoring users on the network; monitoring data (e.g., data packets including data and packet headers) passing through the network; and/or monitoring the quantity of the data passing through the network. In at least one embodiment, the disclosed method further involves evaluating, by at least one processor, the network behavior; and triggering, by the smart agent download, a specific task to be executed when the processor determines an anomaly in the network behavior has occurred. In at least one embodiment, the disclosed method further involves transmitting, by a transmission device associated with at least one claimant, the network behavior to a network operations center; evaluating, by at least one processor at the network operations center, the network behavior; and triggering, by the smart agent download, a specific task to be executed when at least one processor at the network operations center determines an anomaly in the network behavior has occurred.

In one or more embodiments, a system for a network topology aided by a smart agent download involves at least one authenticator device, at least one transmission source, at least one receiving source, and at least one processor. In at least one embodiment, at least one authenticator device is used for authenticating at least one claimant. In some embodiments, at least one transmission source is used for transmitting the smart agent download to at least one receiving source associated with at least one claimant. In one or more embodiments, at least one receiving source is used for receiving the smart agent download. In one or more embodiments, at least one processor is used for executing the smart agent download, where the smart agent download, when executed, is used for monitoring network behavior.

In at least one embodiment, the disclosed system further involves memory that is used for storing the smart agent download. In some embodiments, the disclosed system further involves a transmission device associated with at least one claimant that is used for transmitting the network behavior indicators to a network operations center, and at least one processor at the network operations center that is used for evaluating the network behavior. For these embodiments, the smart agent download triggers a specific task to be executed when at least one processor at the network operations center determines an anomaly in the network behavior has occurred.

In one or more embodiments, an apparatus for a network topology aided by a smart agent download involves at least one authenticator device that is used for authenticating at least one claimant associated with the apparatus. The apparatus further involves at least one receiving source that is used for receiving the smart agent download. In addition, the apparatus involves memory that is used for storing the smart agent download. Further, the apparatus involves at least one processor that is used for executing the smart agent download, where the smart agent download, when executed, monitors network behavior. In some embodiments, the apparatus further involves a transmission source that is used for transmitting the network behavior.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 6 is a schematic diagram of a satellite-based communication system that may be employed by the disclosed spot beam based authentication system, in accordance with at least one embodiment of the present disclosure.

Figure 7A:
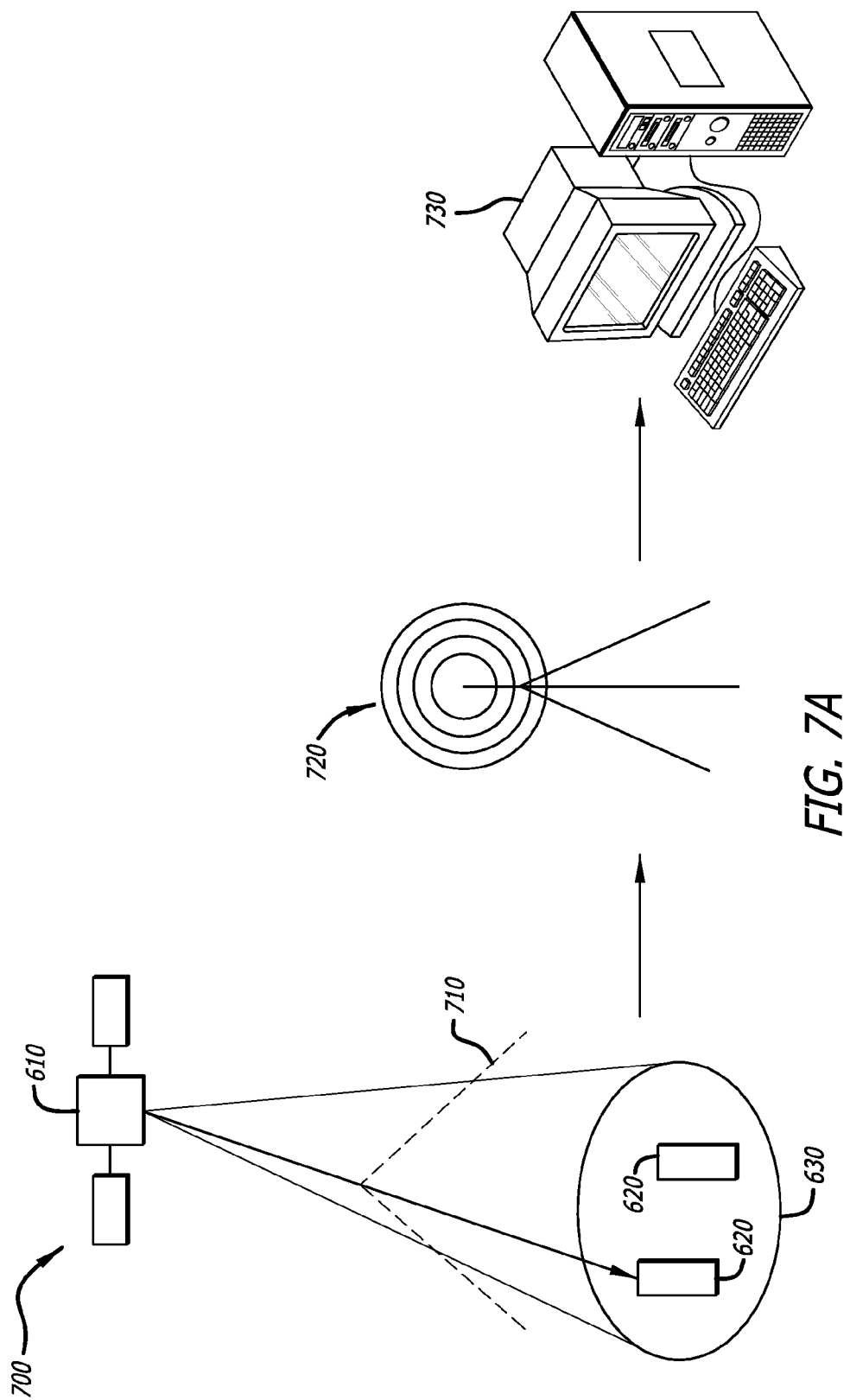
Figure 7B:
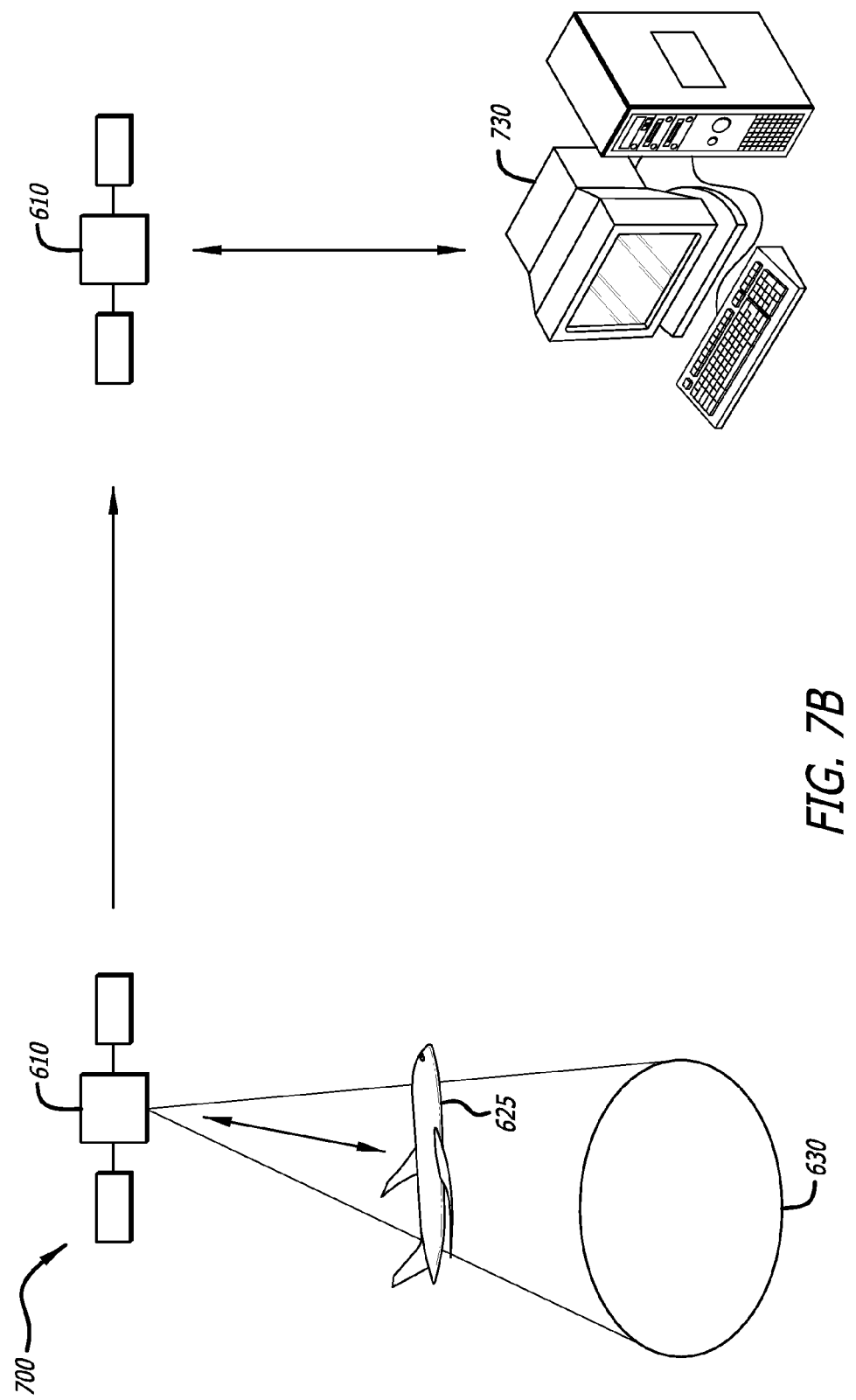
Figure 7C:
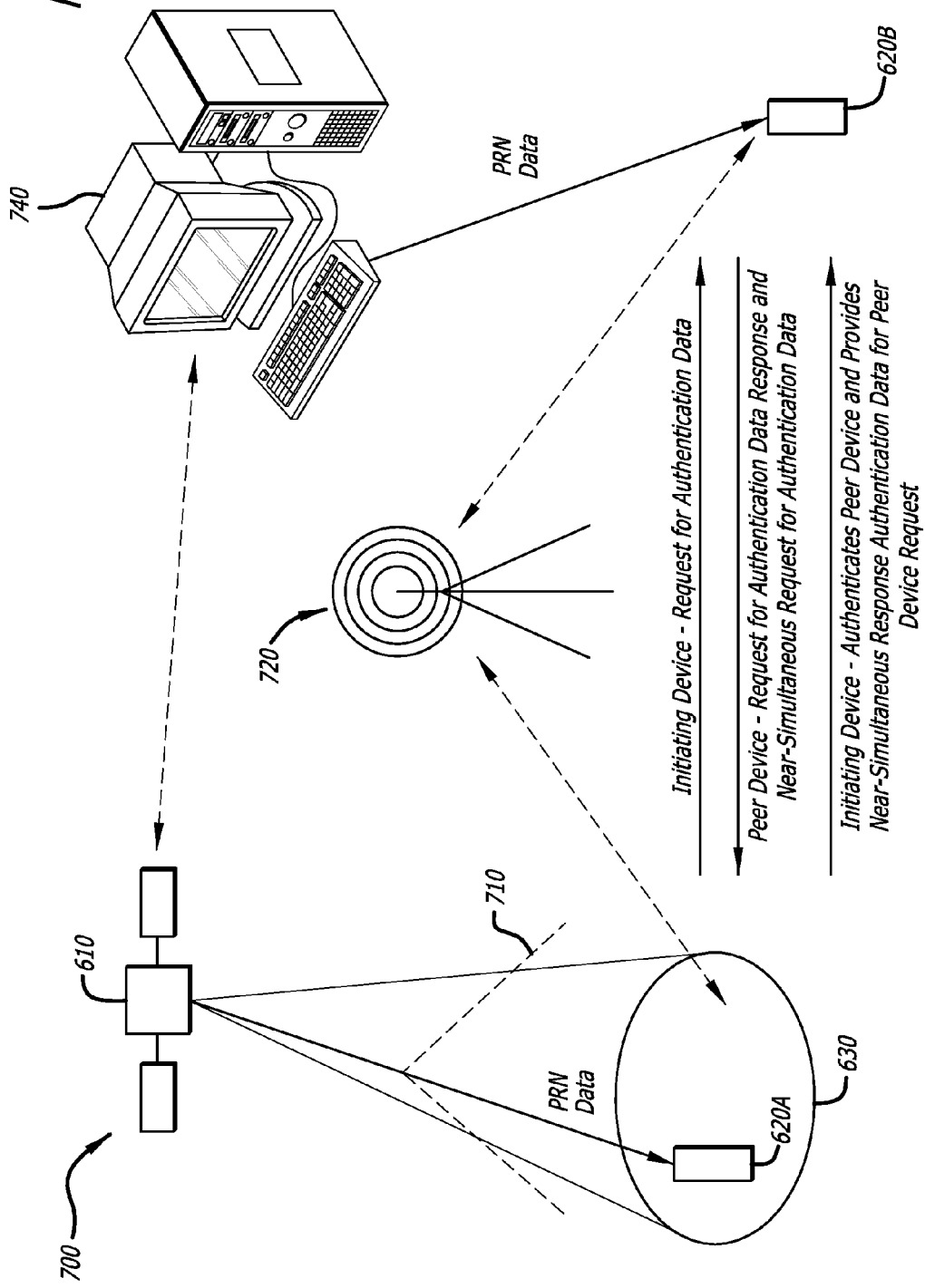

FIGS. 7A, 7B, and 7C are schematic diagrams illustrating satellite-based authentications systems, in accordance with at least one embodiment of the present disclosure.

Figure 8A:
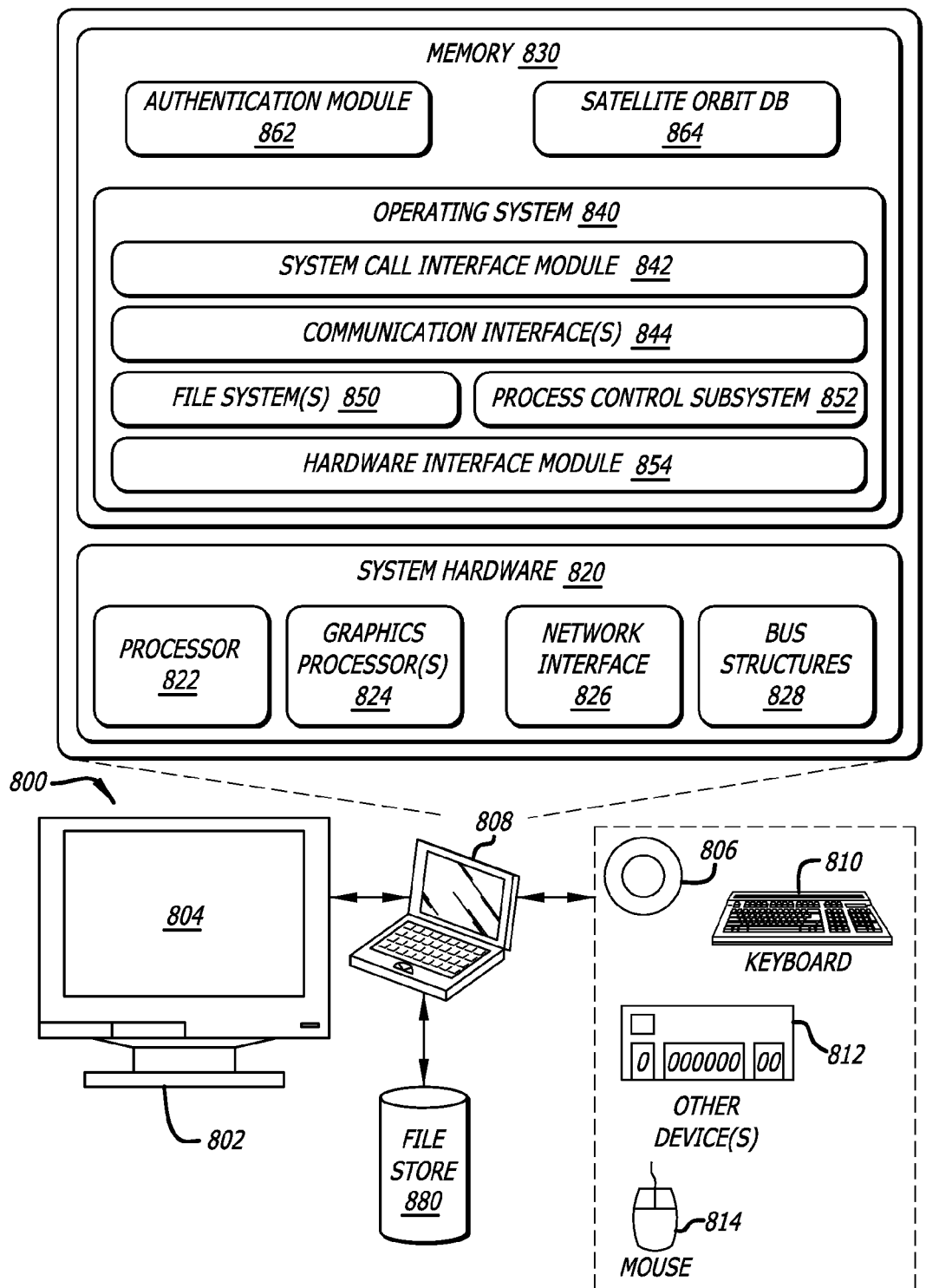

FIG. 8A is a schematic diagram of a computing device which may be adapted to implement the disclosed satellite-based authentication system, in accordance with at least one embodiment of the present disclosure.

Figure 8B:
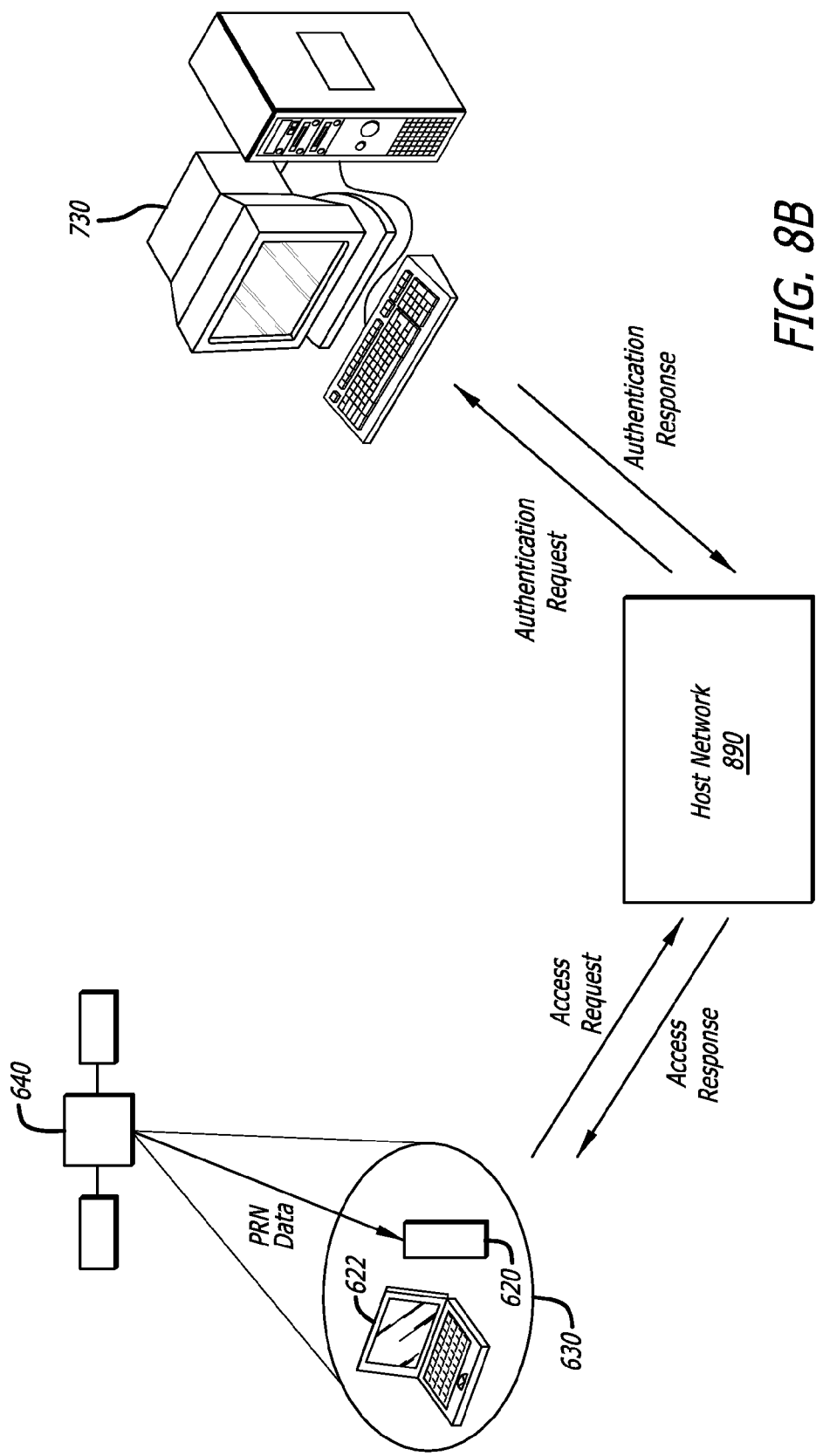

FIG. 8B is a schematic diagram of a satellite-based communication system that may be employed by the disclosed spot beam based authentication system, in accordance with at least one embodiment of the present disclosure.

Figure 9:
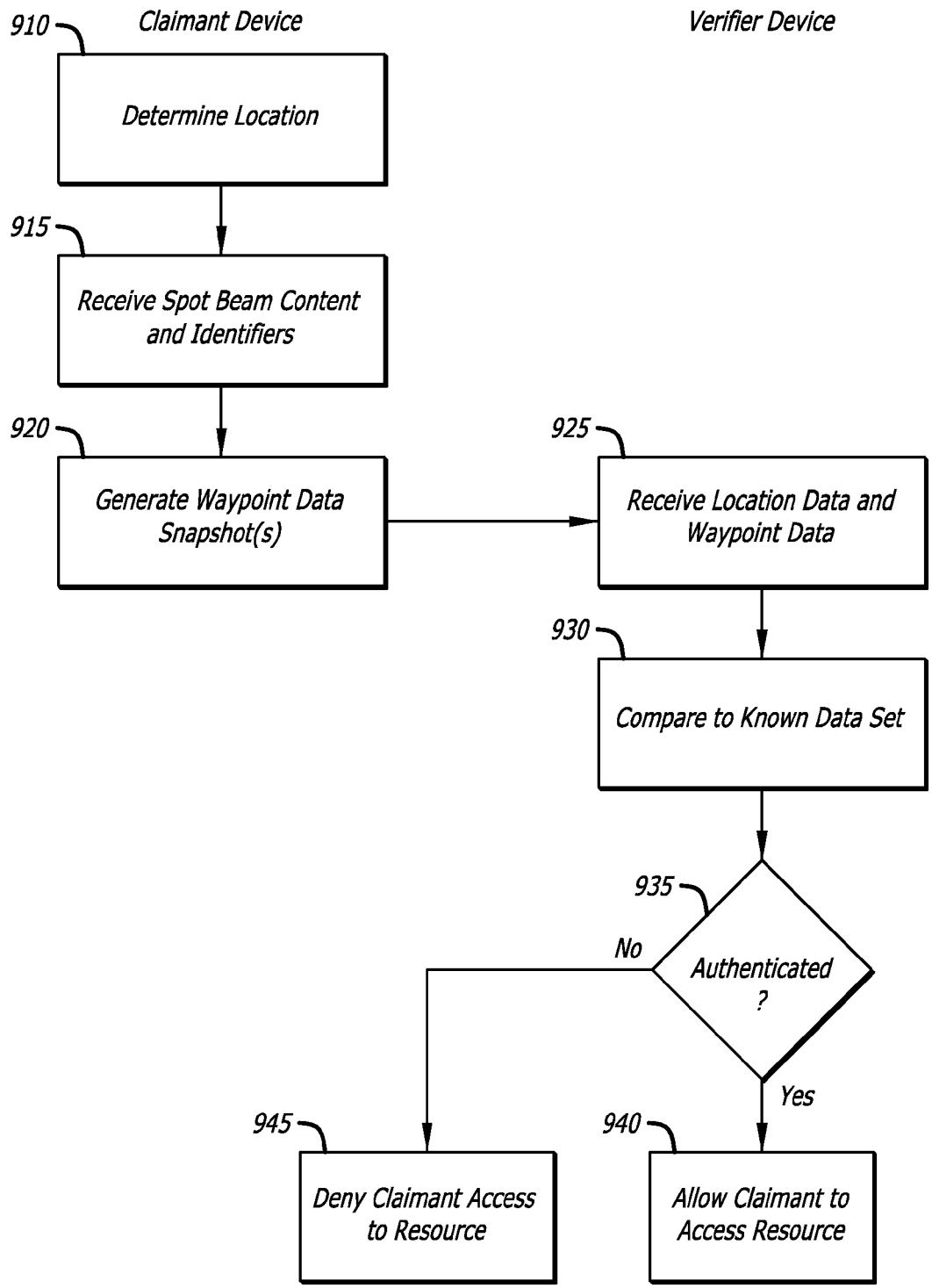

FIG. 9 is a flow diagram showing the disclosed spot beam based authentication method to authenticate a claimant, in accordance with at least one embodiment of the present disclosure.

DESCRIPTION

The methods and apparatus disclosed herein provide an operative system for a network topology aided by a smart agent download. Specifically, this system relates to downloading smart agent software to enabled system and/or network components or devices as needed to support technology advancements and evolving security threats. The disclosed system is able to download the smart agent software to components or devices that are located in attenuated environments, such as indoors. In addition, the disclosed system can be used along with various different geolocating methods to physically map the devices against a typical internet protocol (IP) framework, which identifies where a specific device is accessing a given network from in terms of a physical location (e.g., the IP address of the device may be used to identify the physical location of the device. Similar to a phone number area code, the IP address of a device describes the physical location/region of the device.). The smart agent software is used to monitor various different types of network behavior so as to identify anomalous network activity, which may indicate that a non-legitimate and/or unauthorized claimant is operating on the network.

Currently, cyber-security is becoming increasingly important as electronic systems become more engrained into everyday business and social tasks. Many previously managed business processes have expanded into electronic data processing online, which has made on-going information and computing security advancement techniques a necessary requirement in order to protect these everyday-used systems. Critical documents and other data using information from social security numbers to national infrastructure related information are stored in networked systems that if accessed by an unauthorized party would have varying degrees of societal impact from nuisances to catastrophic societal infrastructure breakdown. In parallel with increased reliance on electronic systems, the nation has also seen a dramatic increase in terrorism and computer hacking; thus requiring society to work towards improving methods to protect our networked computer systems.

Cyber attacks and network penetrations are becoming all too common. These frequent occurrences have brought discussions of dangers of network penetrations by external threats in both commercial and military environments to the forefront. Current access control approaches are principally based on either static passwords, or are authentication based using passwords and smart badge credentials based on Public Key Infrastructure (PKI). As system attacks are often conducted by impersonating the end user, there has been a tendency for organizations to focus on user authentication methods to curtail network data interception network vulnerabilities. These approaches continue to be vulnerable to sophisticated attacks and, thus, a need has developed for a new paradigm of access control leveraging additional dimension/information beyond the normal three dimensions (what you know, what you have, and who you are) of authentication by adding the geospatial location/context, such as user location and user context, to provide an additional and orthogonal layer of protection, which provides an enhanced correlation between location and context awareness from integrated physical geolocation mapping to logical network and information management views.

Furthermore, the fact that existing cyber attacks are often shrouded in anonymity has created additional concerning problems. Larger attacks are often precluded by attempts of the originator to make small intrusions/attacks to better understand the system's vulnerabilities for future exploitation and laying the groundwork for a later, more destructive attack. To date, many large scale cyber attacks have not only left the recipients of the attacks still recovering from the damage left behind, but the recipients are also unable to deter any further damage through retaliation, or otherwise, as without having a clear traceability to the attack's originator and, thus, often lack the authority to respond. If attack motives are unclear, it is further unlikely that the recipient could tell if the attack was a mere act of vandalism, a purposeful theft, or a more sinister approach to threaten national security. As such, any system that would aid in denying network access to rogue users and/or provide traceable data to aid in identifying the originator would have great utility to reduce and mitigate denial of service (DoS) and network data interception attacks.

The present disclosure relates generally to networked systems that benefit from cyber and/or network security. More specifically, the system of the present disclosure improves information and system/network management and security through the use of smart agents downloaded through an authenticated spot beam transmission.

The present disclosure has two primary features. The first feature is the use of smart agent software, which may be downloaded through the disclosed system architecture (i.e., via a LEO satellite downlink, which provides a stronger signal and improved signal structure). Unlike the LEO satellite downlink, existing methods for downlinking are not robust enough to allow a network device indoors to receive such a software update reliably. Furthermore, spot beam based authentication methods are used to identify the exact spot beam in which to send the specific smart agent software in order to get it to the correct enabled receiving device. Unlike other devices in the vicinity, the targeted device can open and extract the executable software using these authentication methods. The targeted user can further verify the download's integrity.

The second feature of the present disclosure is the use of geolocating devices to physically map network devices against a typical IP framework, which identifies where a specific device is accessing a given network from in terms of physical location (e.g., using the device's phone number and/or internet protocol (IP) number to locate the specific location/region of the device). Additionally, the downloaded smart agents can be used to monitor and manage individual users and the network. Captured data and trends can be used to create a network behavioral model. The model and existing/proposed threats can be used to develop defensive and offensive measures that may be managed through use of the smart agents or other available system node software and/or hardware to improve the security of the network. This feature provides a new information management perspective for the improving, tracking, and monitoring of users and/or devices within a system.

Smart Agent Related Embodiments

In one or more embodiments, smart agents may use various types of authentication methods to authenticate adjacent network nodes, data packets, etc. These various different types of authentication methods will be described in detail below in the Spot Beam Based Authentication Section of the present disclosure.

In at least one embodiment, smart agents may manage traffic within or entering the network. For example, a smart agent may be used to slow down traffic nearest to a potential problem area, such as if a network device appeared to be compromised or if malware had been identified. The smart agent may be set-up to take specific actions for each potential threat and, for instance, may be configured to stop or re-route traffic in order to either minimize the impact to the overall system or to stop the threat altogether. Smart agents may be configured to monitor key metrics that may identify possible threats. For example, a man-in-the-middle attack may be identified through a spike in a data latency metric. Once identified, smart agents within the system may reroute data as needed. Important data and/or users can be coordinated with an increased priority so that a DoS attack will have a lesser affect to those critical users. For these cases, critical data/users would be pushed to the front of the queue to minimize the attacks effects.

In some embodiments, smart agents can enforce user access privileges using spot beam authentication methods or enforce other policies that have been implemented to improve the security of the network.

In one or more embodiments, smart agents allow for agile network and system management as additional software, modifications, or updates may be loaded as necessary to the router or other types of system nodes. This could include routine updates to the software or more targeted updates to deal with a new threat. Software modifications/updates, etc. could be completed to systems that are accessible; while the present disclosure is primarily focused on cyber and network management and security, it should be obvious that software could be loaded as needed for a variety of reasons. For example, using a system tailored for a vehicle such as automobile, train, or airplane, this system could be used to complete needed software updates, which could not previously be completed under existing architectures.

In at least one embodiment, smart agents can be used to better improve the accuracy of the system as technology advances. For example, the smart agents could be updated to aid the system in accepting additional differential corrections associated with a newly launched infrastructure. Updates to smart agents via constellation downlinks/downloads can allow the system to be updated for the most up-to-date/best available technologies.

Network Topology Mapping Related Embodiments

In one or more embodiments, smart agents are used to capture data and trends that are used to create and/or improve the network behavioral model. The model and existing/proposed threats can be used to develop defensive and offensive measures that may be managed through use of the smart agents or other available system node software and/or hardware to improve the security of the network.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
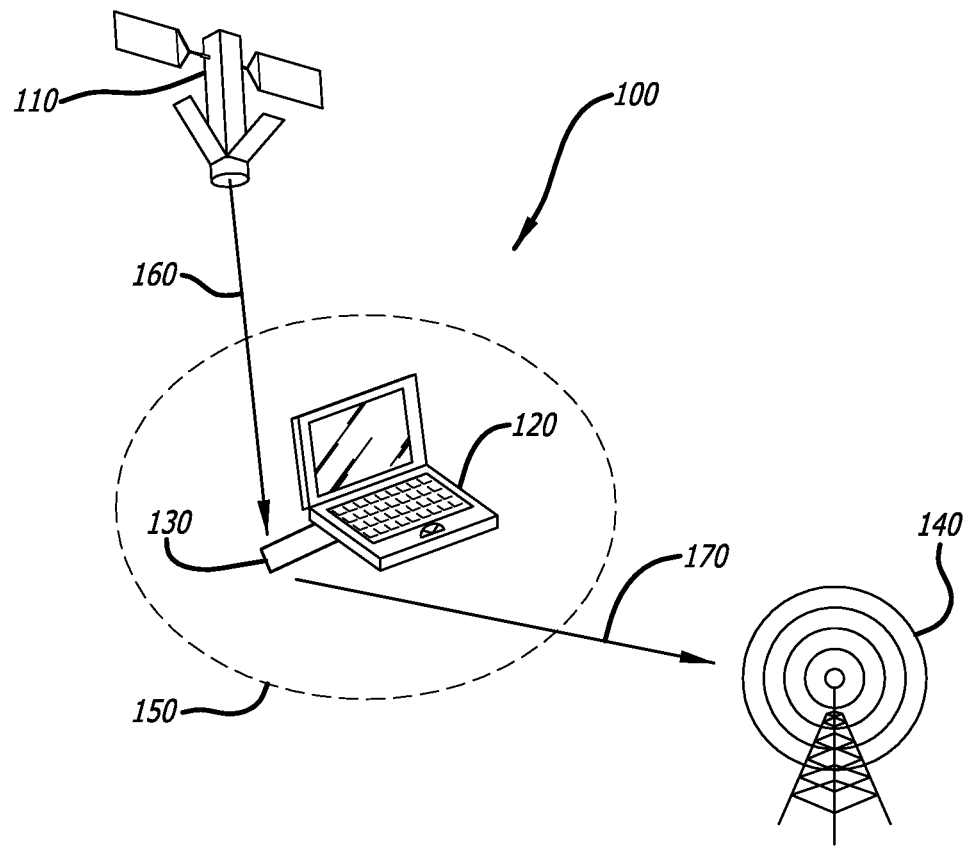
FIG. 1 is a schematic diagram of the disclosed system for a network topology aided by a smart agent download, in accordance with at least one embodiment of the present disclosure.

FIG. 1 is a schematic diagram of the disclosed system 100 for a network topology aided by a smart agent download, in accordance with at least one embodiment of the present disclosure. In this figure, a satellite 110 is shown to be transmitting a signal 160 in a satellite spot beam 150 to geolocation hardware 130, which has geolocation functionality as well as authentication functionality. The spot beam 150 may have a circular footprint as is shown in this figure, or in other embodiments may be a shaped spot beam that has a footprint of an irregular shape. Various types of satellites and/or pseudo-satellites may be employed for the satellite 110 of the system 100. Types of satellites that may be employed for the satellite 110 include, but are not limited to, lower Earth orbiting (LEO) satellites, medium Earth orbiting (MEO), and geosynchronous Earth orbiting (GEO) satellites. In one or more embodiments, a LEO Iridium satellite is employed by the system 100 for the satellite 110. Employing this type of satellite is advantageous because its transmission signal is strong enough to propagate through attenuated environments, including being propagated indoors.

The geolocation hardware 130 may be employed in a device 120 associated with a claimant (e.g., a cell phone, a personal digital assistant (PDA), and/or a personal computer); may be implemented in an authenticator device (not shown) associated with one or more claimants; and/or may be employed in a network component associated with a claimant (e.g., a computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node). The geolocation hardware 130 contains an enabled chipset, and has processing, receiving, transmitting (in some embodiments), and memory functions so that it is able to receive a smart agent download and store it into memory. The geolocation hardware 130 is connected to a network 170, which may be wired and/or wireless. In this figure, the geolocation hardware 130 is shown to be connected to a wireless network 170 that employs a cell tower 140 as a relay. It should be noted that a claimant may be a user and/or an entity and may be stationary and/or mobile.

Prior to the satellite 110 transmitting a smart agent download to the geolocation hardware 130, the claimant is authenticated by the system 100. Various different types of authentication systems and methods may be used by the system 100 to authenticate the claimant. In one or more embodiments, a spot beam based authentication system and method is used by the system 100 to authenticate the claimant. For these embodiments, a LEO Iridium satellite is employed for the satellite 110 to transmit at least one authentication signal that is used to authenticate the claimant. A detailed discussion regarding the spot beam based authentication system and method is presented below in the Spot Beam Based Authentication Section of the present disclosure. In addition, it should be noted that an authenticator device (not shown) may be employed by the disclosed system 100 for authenticating the claimant by evaluating at least one authentication signal transmitted from the satellite 110.

After the claimant has been authenticated, the satellite 110 transmits 160 a smart agent download to the geolocation hardware 130. In one or more embodiments, the smart agent download and at least one authentication signal are both transmitted from the satellite 110. In alternative embodiments, the smart agent download and at least one authentication signal are transmitted from different satellites 110 or transmission sources. In addition, in one or more embodiments, the smart agent download and at least one authentication signal are transmitted on the same frequency. In other embodiments, the smart agent download and at least one authentication signal are transmitted on different frequencies.

After the geolocation hardware 130 receives the smart agent download, the geolocation hardware 130 stores the smart agent download into its memory. After the smart agent download is stored into memory, a processor in the geolocation hardware 130 executes the smart agent download. It should be noted that in alternative embodiments, instead of a processor in the geolocation hardware 130 executing the smart agent download, a different processor may be used to execute the smart agent download. This different processor may be implemented in various devices or components associated with the claimant including, but not limited to, a cell phone, a personal digital assistant (PDA), a personal computer, a computer node, an IP node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and a fourth generation (4G) wireless node.

In addition, it should also be noted that in order for the processor to execute the smart agent download, in one or more embodiments, the processor may need to utilize a specific key, code, and/or other security means to unlock the smart agent download software and to execute it. The use of specific keys, codes, and/or other security means allows nearby "listeners" of the signal containing the smart agent download to not be able to receive and decipher the smart agent download that is being supplied to the targeted device 120.

Upon execution of the smart agent download, the smart agent download software monitors various types of network activity for any possible anomalies in the activity. Types of network activity monitored by the smart agent download may include, but is not limited to, monitoring the usage of the device 120 or component associated with the claimant (e.g., monitoring the usage of a particular node), monitoring the location of the device or component associated with the claimant, monitoring the users operating on the network 170, monitoring the actual data passing through the network 170 (e.g., monitoring the actual data passing through a particular node), and monitoring the quantity of the data passing through the network 170. The smart agent download evaluates the monitored network behavior in order to determine whether an anomaly has occurred. In order to determine whether an anomaly has occurred, a certain predefined and/or programmable activity threshold may be used as a guideline for the smart agent download. Once the smart agent download has determined that the activity threshold has been crossed and, thus, a network behavior anomaly has occurred, the smart agent download will trigger a specific task to be executed. The specific task may be to send a network behavior anomaly message to a network operations center (NOC) (not shown), and/or to shut down the geolocation hardware 130 and/or the component or device 120 associated with the claimant from operating completely or from operating on the network 170.

In alternative embodiments, instead of the smart agent download evaluating the monitored network behavior to determine whether an anomaly has occurred, after the smart agent download has acquired the monitored network activity, the monitored network activity is sent by a transmission source to a NOC for the NOC to evaluate the network behavior to determine whether an anomaly in the activity has occurred. A processor in the NOC is used to evaluate the monitored network activity and to determine whether an anomaly has occurred. Once the processor at the NOC determines that an anomaly in the activity has occurred, the NOC sends a message to the smart agent download alerting the smart agent download software of the anomaly. After the smart agent download receives the message, the smart agent download triggers a specific task to be executed, where the specific task may be to shut down the geolocation hardware 130 and/or the component or device 120 associated with the claimant from operating completely or from operating on the network 170. In other embodiments, once the processor at the NOC determines that an anomaly in the activity has occurred, the NOC does not send an alert message to the smart agent download, but rather the NOC triggers a specific task to be executed, where the specific task may be to shut down the geolocation hardware 130 and/or the component or device 120 associated with the claimant from operating completely or from operating on the network 170.

In other embodiments, instead of the NOC sending a message to the smart agent download notifying the smart agent download software of the anomaly, the NOC triggers a specific task to be executed. The specific task may be to log the anomaly in an anomaly listing stored in memory, to send a message to an operator of the NOC to remove the component or device 120 associated with the claimant from the network 170, and/or to shut down the geolocation hardware 130 and/or the component or device 120 associated with the claimant from operating completely or from operating on the network 170.

Figure 2:
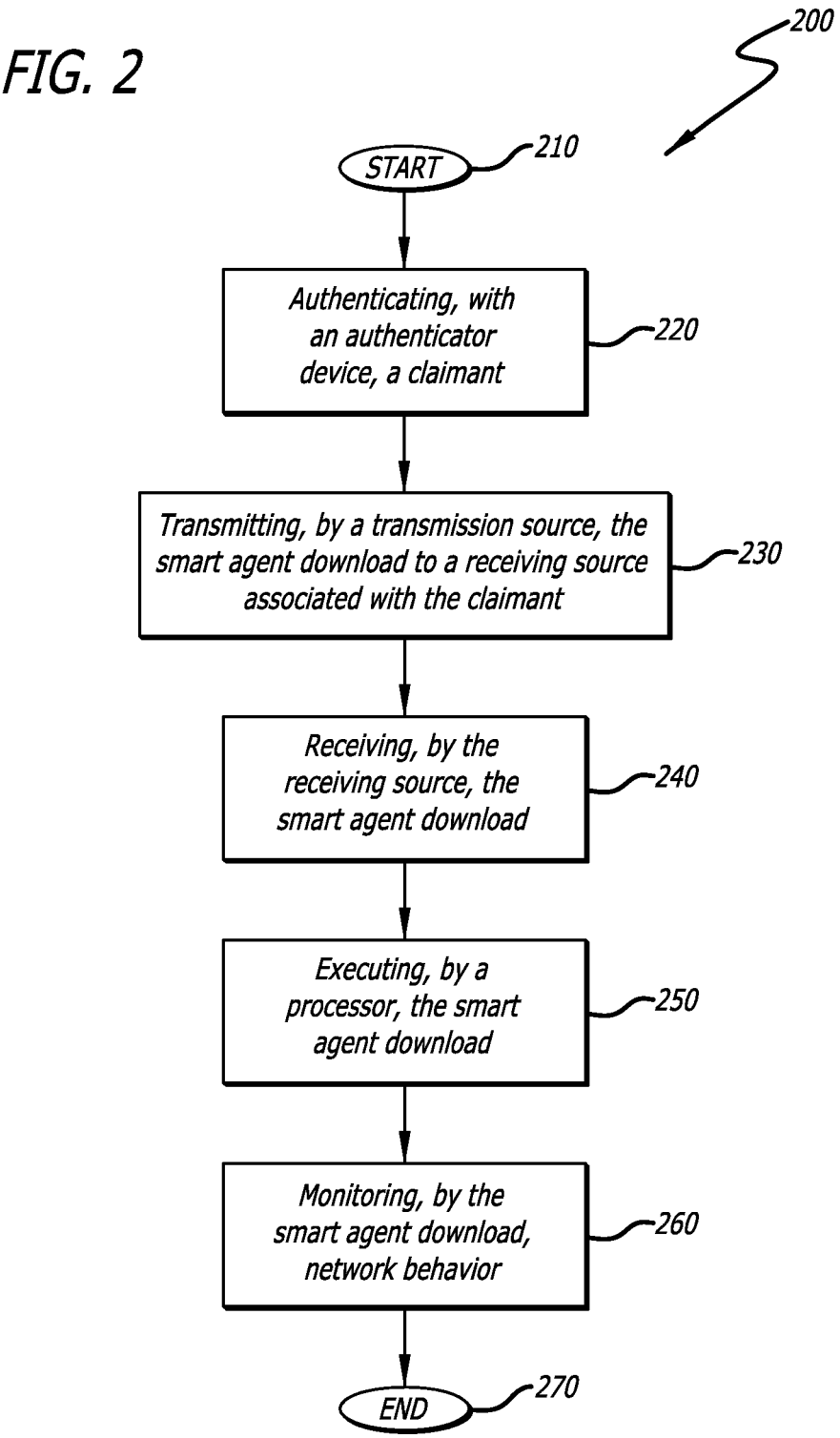
FIG. 2 is a flow diagram of the disclosed method for a network topology aided by a smart agent download, in accordance with at least one embodiment of the present disclosure.

FIG. 2 is a flow diagram 200 of the disclosed method for a network topology aided by a smart agent download, in accordance with at least one embodiment of the present disclosure. At the start 210 of the method, an authenticator device is used to authenticate the claimant 220. After the claimant is authenticated, a transmission source transmits a smart agent download to a receiving source associated with the claimant 230. The receiving source then receives the smart agent download 240. After the receiving source receives the smart agent download, a processor executes the smart agent download 250. Once the smart agent download is executed, the smart agent download software monitors network behavior 260, and then the method ends 270.

Figure 3:
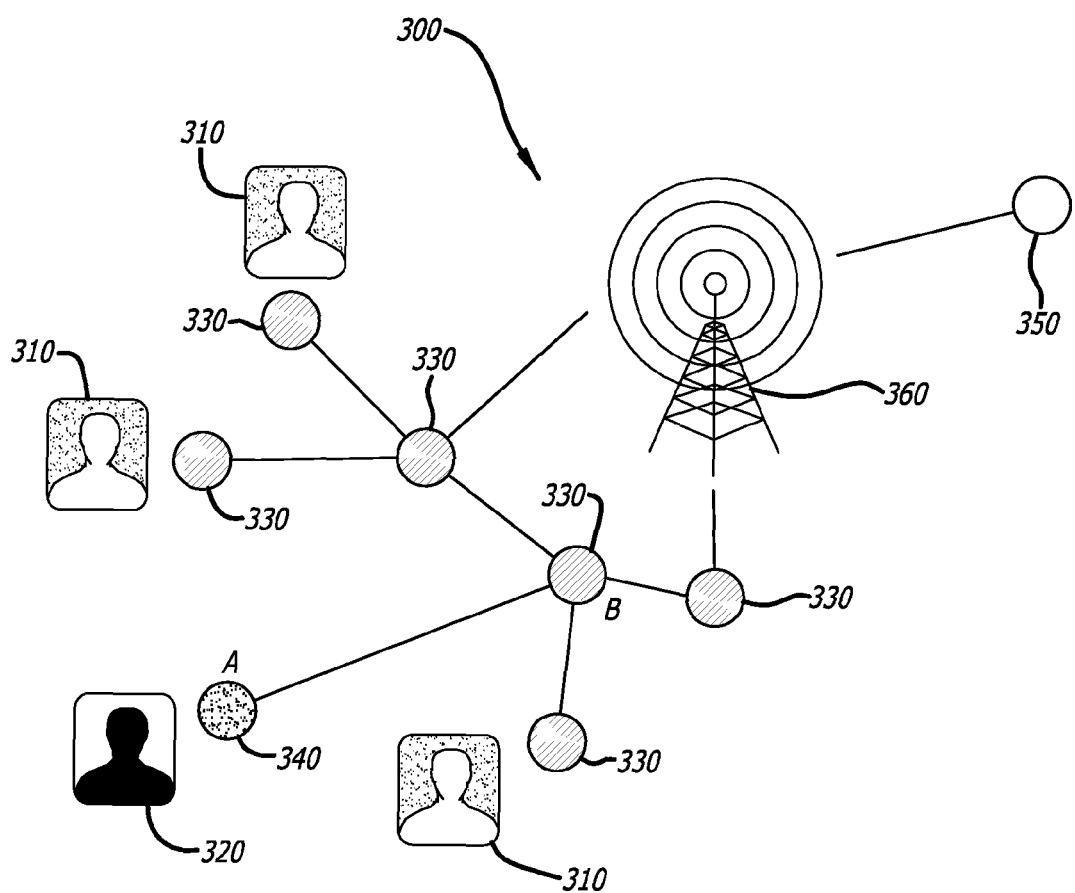
FIG. 3 is a schematic diagram showing a network operations center (NOC) monitoring network behavior, in accordance with at least one embodiment of the present disclosure.

FIG. 3 is a schematic diagram 300 showing a network operations center (NOC) 350 monitoring network behavior, in accordance with at least one embodiment of the present disclosure. In this figure, multiple network nodes 330, 340 are shown to be connected via a wired and/or wireless network. Some of the network nodes 330 act as hubs (e.g., Node B) for routing data over the network. Also, some of the network nodes 330 are shown to have associated authorized and/or legitimate claimants 310, and one node 340 is shown to have an unauthorized and/or non-legitimate claimant 320. Smart agent downloads are downloaded to the network nodes 330, 340, and are executed to monitor network activity. In one or more embodiments, the monitored network activity is wirelessly transmitted to the NOC 350 for evaluation via a cell tower 360.

In accordance with at least one embodiment, smart agent download software may be used to develop individual user (or claimant) behavioral profiles in order to establish user baseline parameters and trends. By understanding the acceptable normal conditions of a user, parameters falling outside appropriate thresholds, which are likely caused by compromised hardware and or malware occurrence, can be more quickly identified and resolved. A collection of individual user behavioral profiles and their interconnections can be reviewed similarly for developing a profile of acceptable network behavioral norms, which can be used to better react to man-in-the-middle attacks, etc. In accordance with at least one embodiment, smart agents may be used to manage traffic within or entering the network.

As shown in FIG. 3, a spoofer 320 by means of a compromised node 340 attempts to access the network at node A 340. Through various means (e.g., the spot beam based authentication system and method as well as the smart agent download monitoring software) the compromised node 340 can be identified. Once identified, the geolocation enabled hardware (not shown in FIG. 3) associated with the node 340 may be used to perform a number of tasks, such as slowing down traffic nearest to the potential problem area in order to minimize the risk to the network, rerouting network traffic, or stopping network traffic at node B 330 in order to quarantine the spoofer 320 so they are incapable of further harming the network or to stop the threat all together. Smart agent download software may be configured to monitor key metrics that may identify these possible threats as well as other threats, such as man in the middle attacks. For example, a man in the middle attack may be identified through a spike in a data latency metric. Once identified, smart agents within the system may reroute data as needed. Important data and/or users can be coordinated with an increased priority so that a denial of service (DoS) attack will have a lesser affect to those critical users. Critical data/users would be pushed to the front of the queue to minimize the attack's effects.

It should be noted that by using smart agent download software, the software can monitor and track the critical Internet backbone/trunk routes for the network traffic. Internet routers perform aggregated network traffic forwarding and routing throughout the network. These forwarding and routing paths are susceptible to manipulation from rogue users that are attempting to gain access to the network. The network traffic can be analyzed by the smart agent download software, both in real-time and offline at a later time, in order to identify possible denial of service (DoS) attacks.

In order to aid in mitigating this potential risk, in one or more embodiments, the disclosed system may leverage adjacent routers (i.e., peer-to-peer routers) in order to classify the network traffic they are forwarding to each other, and to estimate the data latency characteristics for each of the network traffic classifications. These routers may authenticate one another through exchanging and verifying each other's supplied geolocation data. They may obtain their geolocation data through various means including, but not limited to, utilizing global positioning system (GPS) signals and using the spot beam based authentication system and method. Note that while all network traffic would not experience the same data latency characteristics due to factors such as varying the Quality of Service (QoS) provisioning policies and the actual amount of bandwidth associated with each network traffic classification, the data latency characterization may be computed based on a dynamic sliding window that takes into account and adapts to the changing traffic profile based on factors, such as, diurnal patterns and potential failures in the backbone/trunk networking infrastructure.

When a router is added or removed from the Internet networking infrastructure, it causes an update in the network topology and a change to packet forwarding paths driven by the link state protocols, such as OSPF and BGP. The transition in the network traffic profiles caused by diurnal traffic patterns gradually updates the network topology, and changes in the packet forwarding paths more rapidly update the network topology. Changes in the network topology and packet forwarding paths are propagated across the Internet networking infrastructure via network management events and link state protocols and, hence, each router is aware of the discrete event when such a change occurs and can accordingly take it into account for the various estimation processes such as data latency, etc. Under circumstances when the Internet network infrastructure is operating normally, one would not expect drastic changes in the forwarding and routing paths between the routers. As such, if the smart agent download for adjacent peer-to-peer routers detects a deviation in the network traffic characteristics between the two routers for one or more of the network traffic classes that is beyond the baseline acceptable range, the smart agent download can trigger an alert to the network management entities and also enact autonomous mechanisms to limit the potential adverse impact by either policing the rate of the particular class of network traffic, or in an extreme scenario, completely stop or reroute the traffic via an alternate path.

This coordinated mechanism of monitoring and managing the network traffic flow between adjacent peer-to-peer routers can also be employed to ensure that critical network traffic can be allowed to traverse the network using QoS prioritization during DoS attacks. In such scenarios, classes of network traffic that are deemed to be out of the norm from expected traffic shape characteristics can be rate policed at the egress router. The rate policing includes the rate of network traffic being monitored and forced to remain below a certain threshold rate by allowing the most important network traffic through and not allowing through the network traffic that is deemed to be out of the norm. This policing can be used to ensure that the DoS attacks do not propagate further through the network, while allowing critical network traffic through the network. The alerting and notification mechanism to monitor, detect, and arrive at the decision can employ complex event processing (CEP) and analytics, such as causal chain analysis for detection of anomalies and correlations to identify data traffic stream characteristics and policy driven autonomous network management decisions and/or actions. This approach can leverage the use of downloaded targeted smart agent software within each of the routers, which in-turn, can interface with the backed NOC 350 or Network Management entity to extract additional executables as needed.

Figure 4:
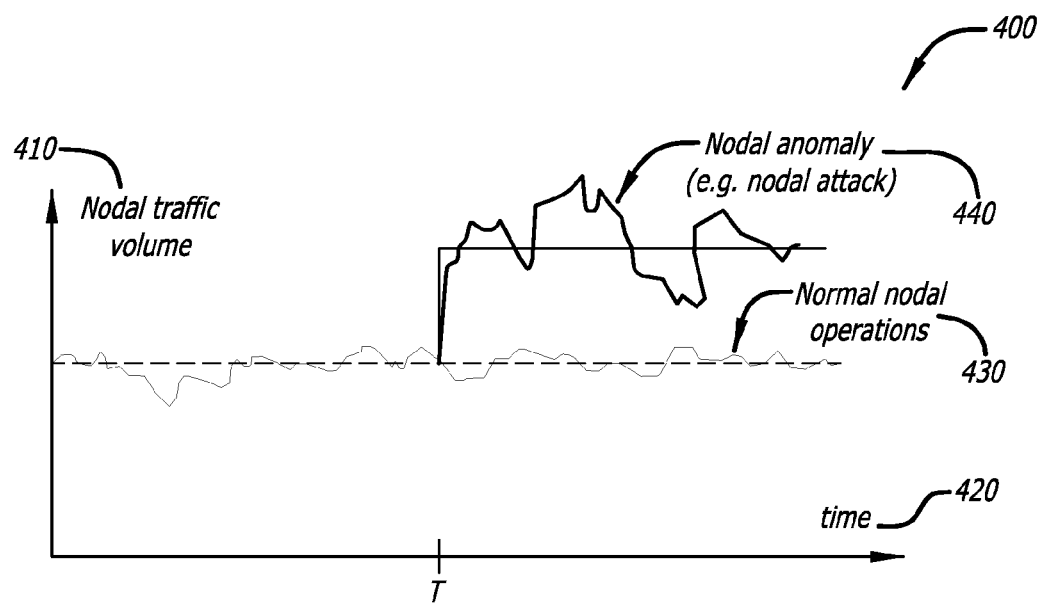
FIG. 4 is a graph illustrating the detection of an anomaly in network behavior, in accordance with at least one embodiment of the present disclosure.

FIG. 4 is a graph 400 illustrating the detection of an anomaly 440 in network behavior, in accordance with at least one embodiment of the present disclosure. In particular, an example graph of data gathered from a smart agent download monitoring the network traffic through a specific node is shown. In this figure, the x-axis depicts the amount of volume of network traffic travelling through a specific node 410, and the y-axis illustrates the passage of time 420. At time zero (0) up until time T, the traffic activity levels of the node stay closely about a normal traffic activity level for the node 430. However, at time T, the traffic activity of the node spikes up to a significantly higher level. From time T and on, the nodal traffic activity levels for the node are shown to be much higher than the normal nodal traffic activity level, and thus, by analyzing this data, the smart agent download will determine that a nodal anomaly 440 has occurred for the node (e.g., a nodal attack is occurring).

Figure 5:
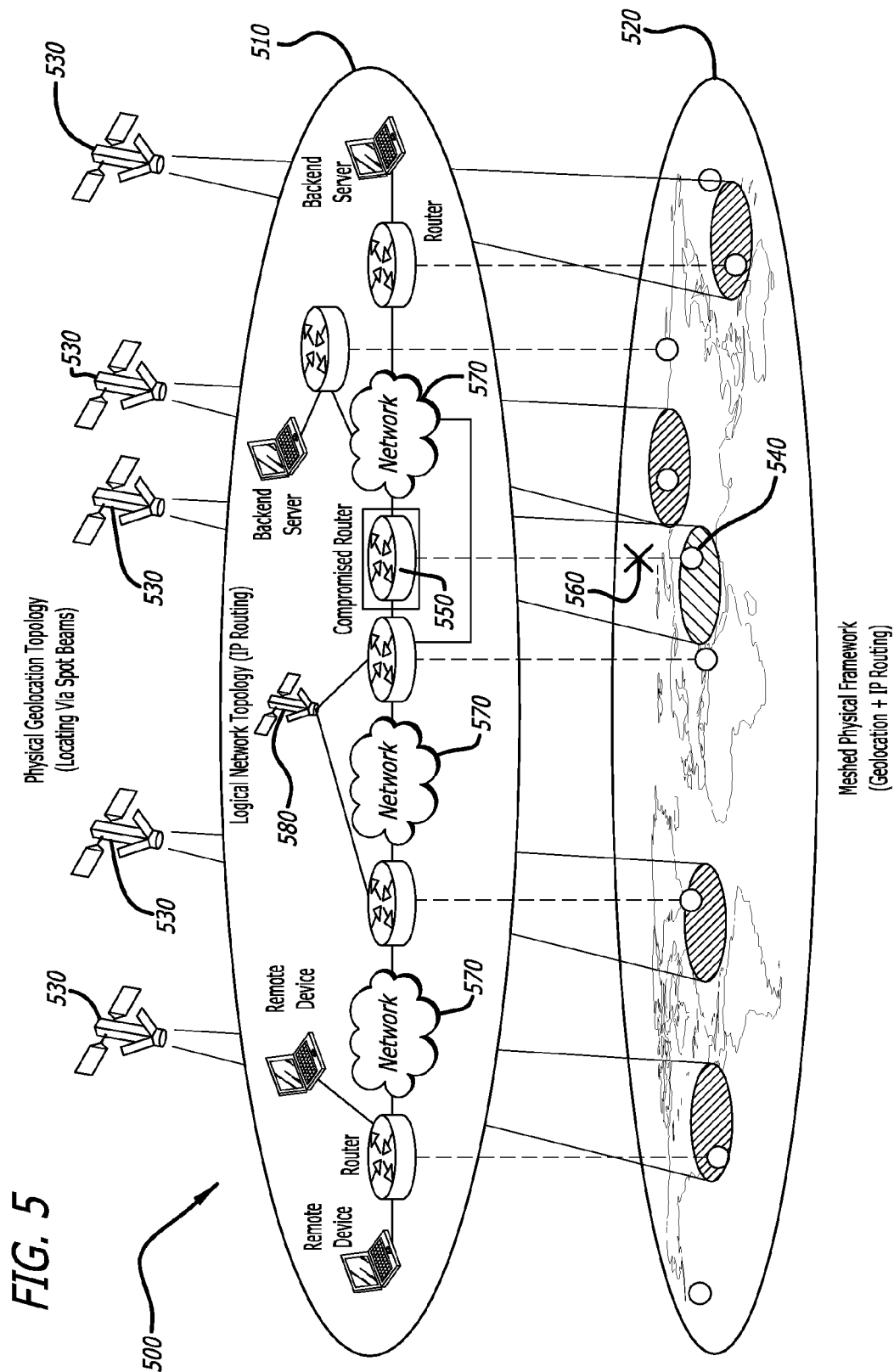
FIG. 5 is schematic diagram showing an example meshed physical framework that correlates a logical topology to a physical topology of a network, in accordance with at least one embodiment of the present disclosure.

FIG. 5 is schematic diagram showing an example meshed physical framework 500 that correlates a logical topology 510 to a physical topology 520 of a network, in accordance with at least one embodiment of the present disclosure. The binding of the physical and logical views and visibility into the network behavior model from both views enables the smart agent download to more accurately and robustly track and trace specific events and behaviors, and further ascertain the source or sources of anomalous events under observation. The backend NOC or Network Management entity may use the monitoring information relayed by the cooperating enabled computing devices and routers to construct a behavioral model, which can allow for tailored communication and computing for cyber defense and offense purposes.

In this figure, the logical topology 510 relates to the way data is transferred within the network. In this case, data is transferred throughout the network 570 via IP routing and through the use of a relay satellite 580. The physical topology 520 relates to the physical network design and in this application is based on the node locations on or near the Earth's surface. The disclosed system uses satellites 530 and receivers to allow the network nodes to geolocate themselves. Their physical locations can then be mapped against an IP protocol logical mapping in order to help improve network security. For example, a compromised network node 540, such as a router 550, can be identified and blocked 560, for instance by the NOC by sending a notification either directly to the compromised node's chipset or to a gateway node in an affect of quarantining the area of concern.

Spot Beam Based Authentication

Entity or user authentication techniques enable a third party verifier to validate the identity of a user, asset, or a device (e.g., a claimant) for a remote resource through a one-way authentication method. However, it should be noted that this one-way method may also be used directly by a host system to validate a claimant. An entity may be a device (e.g., a mobile phone, computer, server, or the like) or asset that needs to be tracked, while a user can be a person or other living/non-living entity. An entity and/or user may be authenticated for the duration of an entire connection or session. The entity and/or user may require re-authentication after the original authentication. The re-authentication requirements may be defined by the host network and may be context specific. Alternatively, this system may be used for a message-based authentication system which requires a separate authentication process for each message. Techniques described herein may be used for either session-based authentication, message-based authentication, or a combination thereof.

Additionally, this method may be applied to receiving devices themselves, such that the one-way authentication does not have to be completed by a remote third party but rather by one or more of the receiving devices. When this method is conducted by a single device it is still considered a one-way authentication method. However, this method can also be applied in a multi-way authentication technique to allow at least two peer devices to authenticate each other. In this one-way or multi-way device-to-device authentication method, authentication may generally rely on a shared secret (symmetric and asymmetric) that each of the two legitimate receiving devices know and any unauthorized or rogue receiving device does not know. Each device may have a unique authentication credential such as a secret password shared between itself and the peer device or public/private key pairs in the form of security certificates. A device has authenticated itself when it proves, to the satisfaction of the other peer device, that it knows the shared secret, and is, therefore, legitimate. Once authentication is complete between the at least two devices in this multi-way authentication method, the devices have proven their identities to one another. The devices may then create their own authenticated network which they may choose to implement cyber security policies which have been agreed on so as to protect the communication and access to networked resources for a given context.

Existing authentication methods may be used or combined to generate the initial-security key(s). The initial-security key may, for example, be cooperatively generated using Diffie-Hellman techniques or may simply be generated by one peer device and sent to the other via an alternate secure channel/process.

In any case, accompanying the initial-security key may include some shared liveness information (as previously defined). In this application, the liveness information is provided through a satellite spot beam and may include such parameters for use in authentication as a timestamp and pseudo-random number (PRN).

The use of the shared liveness information may be used in the derivation allowing for different security keys to be used every time the initiating device authenticates itself to the peer device. This hinders a potential rogue eavesdropper from initiating a statistical attack every time the initiating device is authenticated, adding newly intercepted messages to its analysis of messages intercepted during the initiating device's previous sessions. The liveness information and the initial-security key may then be passed as inputs to a determinative function. As used herein the term "determinative" refers to a function for which the outputs of the function are completely determined by the inputs. This determinative function may be run separately on the initiating device and on the peer device. If these two devices were to produce different outputs when they ran the determinative function, then the security keys derived from the function would not match, the device could not be authenticated, and thus could not be used for intercommunication.

In addition to being determinative, for security's sake the function should be inherently irreversible. Knowing the function's outputs, it should be very difficult or impossible to determine its inputs. Hashes form a class of functions that are both determinative and inherently irreversible and, as such, are often used in encryption and authentication calculations. Pseudo-random function (PRF) used with the well known Transport Level Security (TLS) protocol are an example of the determinative function implementation which may be used.

PRF combines the results of two well known hash functions, Message-Digest Algorithm 5 (MD5) and Secure Hash Algorithm 1 (SHA-1). PRF uses two hash functions in order to preserve security just in case someone determines how to reverse one of the two hash functions. These two hash functions produce outputs that may be too short to be optimum for security. SHA-1 produces 20-byte outputs, and MD5 produces 16-byte outputs. Therefore, for each of the two hash functions, a "data expansion function" may be defined that uses the hash function to produce output of arbitrary length. For SHA-1, the data expansion function may be defined as P_SHA-1:

$$P\_SHA\text{-}1 \text{ (initial-security key, liveness)} = SHA\text{-}1 \text{ (initial-security key, } A(1)+\text{liveness})+SHA\text{-}1 \text{ (initial-security key, } A(2)+\text{liveness})+SHA\text{-}1 \text{ (initial-security key, } A(3)+\text{liveness})+ \quad \text{EQ 1}$$

where $A(0)$=liveness;
$A(i)$=SHA-1 (initial-security key, $A(i-1)$);
and the "+" sign indicates string concatenation.

The definition of the data expansion function P_MD5 is similar to the above definition with "MD5" replacing "SHA-1" wherever it appears. The data expansion functions may be iterated to as many steps as necessary to produce output of a desired length. The desired output length may be set as an implementation option. In at least one embodiment, the desired output length for each hash function is 128 bytes. P_SHA-1 may be iterated out to A(7) for a total output length of 140 bytes (each iteration increasing the output length by 20 bytes). The output may then be truncated to 128 bytes. Each iteration of P_MD5 produces 16 bytes, so iterating it out to A(8) produces the desired 128 bytes with no truncation.

In one embodiment for spot beam based authentication, having chosen the hash functions and iterated their data expansion functions out to the desired output length, PRF takes as inputs the expanded initial-security key, a label (a pre-determined ASCII string), and the liveness information exchanged. PRF is defined to be the exclusive bit-wise OR (XOR) of the output of the two hash data expansion functions, P_MD5 and P_SHA-1:

$$PRF \text{ (expanded initial-security key, label, liveness)} = P\_MD5(S1, \text{label}+\text{liveness}) \text{ XOR } P\_SHA\text{-}1 \text{ } (S2, \text{label}+\text{liveness}) \quad \text{EQ: 2}$$

where S1 is the first half of the expanded initial-security key, measured in bytes, and S2 is the second half of the expanded initial-security key. (If the expanded initial-security key's length is odd, then its middle byte is both the last byte of S1 and the first byte of S2). As P_MD5 and P_SHA-1 are iterated to produce 128-byte outputs, the output of PRF is also 128 bytes.

The 128-byte output of PRF is divided into four 32-byte session security keys. Then each of the session security keys and truncates it to the length required by the authentication and encryption protocols being used. The truncated result is one of the new set of transient session security keys. The derivation of the transient session security keys allows for both the initiating device and peer device to not directly use either the initial-secret key or the expanded initial-security key in order to minimize, or at least to reduce, the leakage of the security key information. The derivation of the transient session security keys also allows for the initiating device and the peer device to refresh the session security keys derived from the expanded initial-security key at regular intervals or when commanded to prevent statistical analysis by limiting the use of the session security keys.

Each of the authentication and encryption transient session security keys have the following specific purpose: i) encryption of data exchanges, for confidentiality, from initiating device to peer device; ii) encryption of data exchanges, for confidentiality, from peer device to initiating device; iii) signing of data exchanges, for integrity, from initiating device to peer device; and iv) signing of data exchanges, for integrity, from peer device to initiating device.

Derivation of the initial-security key for the spot beam based authentication may use Diffie-Hellman techniques using agreed upon and well known public primitive root generator "g" and prime modulus "p". The initiating device and the peer device each choose a random secret integer and exchange their respective ((g^(secret integer)) mod p). This exchange allows the initiating device and peer device to derive the shared initial-secret key using Diffie-Hellman.

Having derived the initial-secret key that is shared between both the initiating device and the peer device they may use the data expansion to derive the expanded initial-secret using, for example, the P_SHA-1. The liveness information for the data expansion process may be a known random value or timestamp that is agreed upon by the initiating device and the peer device. In some embodiments, the peer device may select a random value and transmit it to the initiating device via the satellite or the terrestrial network. Alternatively, both the initiating device and the peer device may agree upon a timestamp, since they are tightly time synchronized, and thereby avoid data exchanges while being able to select liveness from the shared/common timestamp value.

Following this the initiating device and the peer device have a shared expanded initial-secret key that may be used to derive the new set of transient session security keys. Again for liveness the initiating device and the peer device may use either a shared random value that is transmitted by the peer device or a shared/common timestamp value. The transient session security keys may be used by initiating device and the peer device for further encryption and signing of geolocation and other context information exchanges between initiating device and peer device. Geolocation and other context information is considered confidential and hence it is appropriate that such information be encrypted to ensure that only the authenticated initiating device and peer device can extract the exchanged geolocation and context information. Note that the geolocation is authenticated by the procedure described in this patent application using pseudorandom (PRN) code segments and distinctive beam parameter. The context information shared may include other state or control information for targeted cyber defense application execution or decision support systems. In addition to encryption the integrity of the exchanged geolocation and context information is ensured by the use of the transient session security keys for signing purposes as discussed earlier.

In brief overview, in some embodiments the authentication systems and methods described herein may leverage geolocation techniques for determining the position of the claimant as part of the authentication process. One such geolocation technique is defined in commonly assigned and copending U.S. patent application Ser. No. 12/756,961, entitled Geolocation Leveraging Spot Beam Overlap, the disclosure of which in incorporated herein by reference in its entirety. When authentication is required, the claimant device may capture and transmit the distinctive signature parameters to a verifying device. In addition, the claimant device may transmit its claimed travel path (i.e., waypoint(s) and time at each). Waypoints may be transmitted whether the device is stationary or mobile. A verification device may use the claimant's claimed beam signature parameters, at least one location waypoint, and at least one time associated with this waypoint and beam parameter capture to authenticate the claimant. For example, a claimant may be considered authenticated by the verifier if the beam parameters captured from the at least one spot beam and the at least one claimed waypoint are affirmed against a known valid data set. In this manner, the claimant can be authenticated as being within a region at a particular time. The composite code based on these parameters provide a signal that is extremely difficult to emulate, hack, or spoof. Furthermore, the signal structure and satellite's received signal power allows for the authentication to be used indoors or other attenuated environment. This improves the overall utility of this system approach.

The subject matter of this application is described primarily in the context of low-earth orbiting (LEO) satellites such as those implemented by Iridium satellites. However, one skilled in the art will recognize that the techniques described here are readily applicable to other satellite systems, e.g., medium-earth orbit (MEO) satellite systems or geosynchronous orbit (GEO) satellite systems. Such satellite based communication systems may include or utilize other mobile communication systems, e.g., airborne communication systems or the like, as well as, stationary communication platforms including but not limited to a ship or a cell phone tower.

Figure 6:
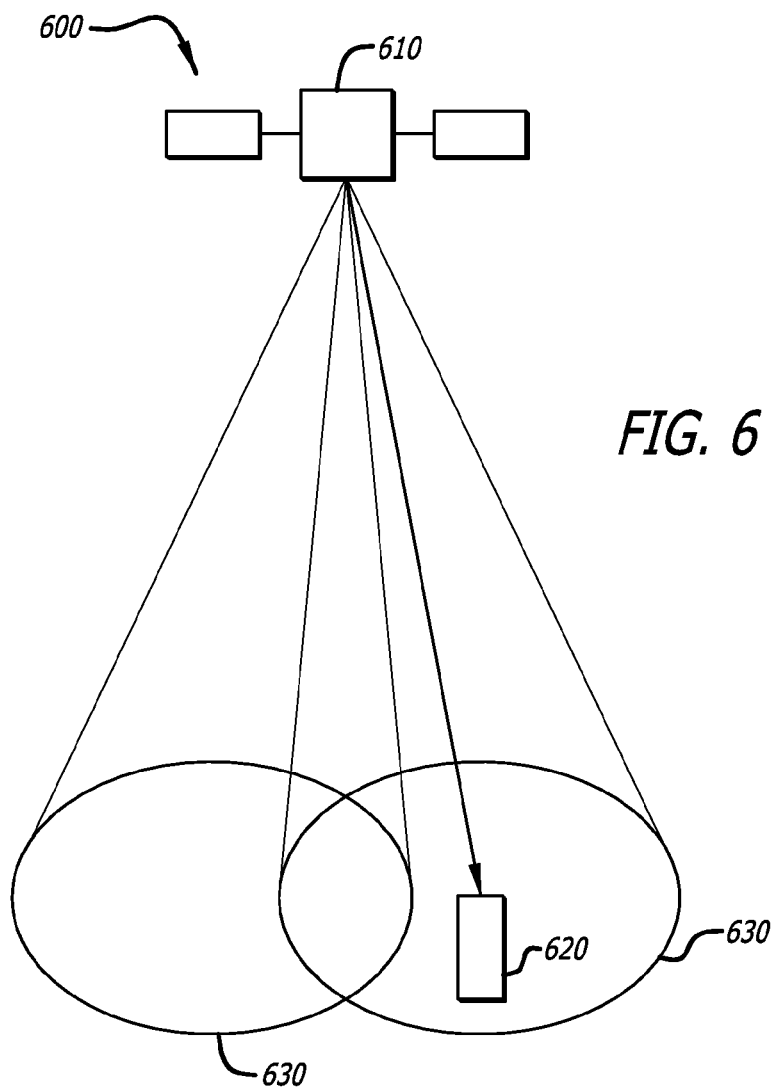
FIGS. 6 through 9 are directed towards the disclosed system and method for spot beam based authentication of claimants.

FIG. 6 is a schematic illustration of a satellite-based communication system 600, according to embodiments. In practice, a satellite based communication system 600 may comprise of at least one satellite 610 in orbit. In the interest of brevity, a single satellite is illustrated in FIG. 6. Referring to FIG. 6, in some embodiments a system 600 comprises one or more satellites 610 in communication with one or more receiving devices 620. In some embodiments the satellites 610 may be embodied as LEO satellites such as those within the Iridium satellite constellation. Satellite(s) 610 orbit the earth in a known orbit and may transmit one or more spot beams 630 onto the surface of the earth in a known pattern. Each spot beam 630 may include information such as pseudorandom (PRN) data and one or more distinctive beam parameters (e.g., time, satellite ID, time bias, satellite orbit data, etc.).

Receiving device(s) 620 may be implemented as communication devices such as satellite or cellular phones or as components of a communication or computing device, e.g., a personal computer, laptop computer, personal digital assistant or the like. In some embodiments, a receiving device (620) may comprise one or more locating or navigation devices or modules analogous to devices used in connection with the global positioning system (GPS).

FIGS. 7A, 7B, and 7C are schematic illustrations of satellite-based authentication systems 700, according to embodiments. Referring first to FIG. 7A, in some embodiments a satellite 610 in orbit transmits one or more spot beams 630 onto the earth's surface. A receiving device 620 may be configured to receive a signal from the spot beam. In the embodiment depicted in FIG. 7A the receiving device is ground-based and may be operating in attenuated environment. By way of example, an object 710 such as a roof, building, or the like may obstruct a portion of the communication path between satellite 610 and the receiving device.

A transmitter 720 transmits data received by the receiving device 620 and/or data generated by the receiving device 620 to a verifier 730. The transmitter 720 depicted in FIG. 7 is a wireless transmitter that relays the data from the receiving device to the verifier. However, one skilled in the art will recognize that data from receiving device 620 may be transmitted via a wired communication system, wireless communication system, or a combination of wired and wireless systems. The verifier 730 uses data captured via a spot beam by the receiving device 620 to prove to the verifier 730 that it is an authorized user via a one-way authentication approach which is also the case in FIG. 7B.

Furthermore, FIG. 7B depicts an arrangement in which the receiving device 620 may be airborne, e.g., in an aircraft 625. In the embodiment depicted in FIG. 7B the aircraft 625 may maintain an uplink with the satellite 610, e.g., an L-Band Uplink, and data captured by the receiving device 620 in the aircraft may be transmitted back to the satellite 610 via the uplink. The satellite 610 may transmit the data to a second cross-linked satellite 610, which in turn may transmit the data to a verifier 730.

The system depicted in FIG. 7C illustrates an embodiment in which two (or more) peer devices 620 may implement a two-way authentication technique to authentication each other. Referring briefly to FIG. 7C as described above a satellite 610 in orbit transmits one or more spot beams 630 onto the earth's surface. A first receiving device 620A may be configured to receive a signal from the spot beam. The first receiving device 620A may be configured to derive a security key, e.g., using a Diffie-Helman approach as described above, which incorporates PRN data from the spot beam.

The PRN data is also transmitted to a second device 620B. In some embodiments the second device 620B may be outside the spot beam 630, in which case the PRN data may be transmitted by a computing device 740 coupled to the second device 620B via a communication network. The computing device 740 may be communicatively coupled to the satellite 610. By way of example, and not limitation, the computing device 740 may be a server that is separately coupled to the satellite 610 via a communication link. The computer 740 may be associated with a control network for satellite 610 and may thereby possess PRN data associated with the spot beam 630.

In operation, the first receiving device 620A initiates a request for authentication data, which is transmitted to the second receiving device 620B. The communication link between the first receiving device 620B may be direct or may be implemented through a transmit network 720. The second receiving device 620B responds to the request and issues a near-simultaneous request for authentication data from the first receiving device 620A. The first receiving device 620A authenticates the second receiving device 620B and issues a near-simultaneous response to for authentication data to the second receiving device 620B, which may then authenticate the first receiving device 620A.

As described above, the authentication process implemented between the first receiving device 620A and the second receiving device 620B may be a Diffie-Hellman exchange in which the shared secret comprises at least a portion of the PRN data transmitted by the spot beam 630. Thus, the system depicted in FIG. 7C enables peer-to-peer authentication of receiving device 620A, 620B. One skilled in the art will recognize that this two-way authentication approach could be extended to a receiving device and a server as well as other hardware architectures, or to more than two devices.

FIG. 8A is a schematic illustration of a computing system which may be adapted to implement a satellite based authentication system, according to embodiments. For example, in the embodiments depicted in FIGS. 7A and 7B the verifier 730 may be implemented by a computing system as depicted in FIG. 8A. Referring to FIG. 8A, in one embodiment, system 800 may include a computing device 808 and one or more accompanying input/output devices including a display 802 having a screen 804, one or more speakers 806, a keyboard 810, one or more other I/O device(s) 812, and a mouse 814. The other I/O device(s) 812 may include a touch screen, a voice-activated input device, a track ball, and any other device that allows the system 800 to receive input from a user.

The computing device 808 includes system hardware 820 and memory 830, which may be implemented as random access memory and/or read-only memory. A file store 880 may be communicatively coupled to computing device 808. File store 880 may be internal to computing device 808 such as, e.g., one or more hard drives, CD-ROM drives, DVD-ROM drives, or other types of storage devices. File store 880 may also be external to computer 808 such as, e.g., one or more external hard drives, network attached storage, or a separate storage network.

System hardware 820 may include one or more processors 822, at least two graphics processors 824, network interfaces 826, and bus structures 828. In one embodiment, processor 822 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 824 may function as adjunct processors that manage graphics and/or video operations. Graphics processors 824 may be integrated onto the motherboard of computing system 800 or may be coupled via an expansion slot on the motherboard.

In one embodiment, network interface 826 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 828 connect various components of system hardware 820. In one embodiment, bus structures 828 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 830 may include an operating system 840 for managing operations of computing device 808. In one embodiment, operating system 840 includes a hardware interface module 854 that provides an interface to system hardware 820. In addition, operating system 840 may include a file system 850 that manages files used in the operation of computing device 808 and a process control subsystem 852 that manages processes executing on computing device 808.

Operating system 840 may include (or manage) one or more communication interfaces that may operate in conjunction with system hardware 820 to transceive data packets and/or data streams from a remote source. Operating system 840 may further include a system call interface module 842 that provides an interface between the operating system 840 and one or more application modules resident in memory 830. Operating system 840 may be embodied as a UNIX operating system or any derivative thereof (e.g., Linux, Solaris, Berkeley Software Distribution (BSD), Android, etc.) or as a Windows® brand operating system, or other operating systems.

In various embodiments, the computing device 808 may be embodied as a personal computer, a laptop computer, a personal digital assistant, a mobile telephone, an entertainment device, or another computing device.

In one embodiment, memory 830 includes an authentication module 862 to authenticate a claimant based on data received from the claimant. In one embodiment, an authentication module 862 may include logic instructions encoded in a non-transitory computer-readable medium which, when executed by processor 822, cause the processor 822 to authenticate a claimant based on data received from the claimant. In addition, memory 830 may comprise a satellite orbit database 864 which includes orbit information for satellites 610 in a predetermined orbit around the earth. Additional details about the authentication process and operations implemented by authentication module 862 are described below.

In some embodiments the receiving device 620 may be implemented as a satellite communication module adapted to couple with a conventional computing device 622 (e.g., a laptop, a PDA, or a smartphone device). The receiving device 620 may be coupled to the computing device 622 by a suitable communication connection, e.g., by a Universal Serial Bus (USB) interface, an RS-232 interface, an optical interface, or the like. In the embodiment depicted in FIG. 8B the receiving device 620 may be a "thin" device in the sense that it may include a receiver and limited processing capability, e.g., an application specific integrated circuit (ASIC) or a field programmable gate array (FPGA) configured to implement an authentication routine.

In operation, a user of the computing device 622 may utilize the receiving device 620 to authenticate the computing device 622 with a host network 890. As described above, the receiving device 620 depicted in FIG. 8B may receive a spot beam transmission 630 from the satellite 610 which includes a distinctive beam signature and a pseudo-random number (PRN). The computing device 622 may initiate an access request to the host network 890. The access request may include user specific information, e.g., a user ID, one or more coordinated from an earth-based coordinate system (e.g., a zip code, an area code, a latitude/longitude, a Universal Transverse Mercator (UTM); an Earth-Centered Earth-Fixed (ECEF), a World Geographic Reference System (GEOREF), or other miscellaneous system, for example, a zip code) and at least a portion of the PRN data received from the satellite 610.

The host network 890 may transmit a user access request to the verifier 730 as an authentication request. In some embodiments the host network may add additional information to the request en enable the verifier 730 to authenticate the computer 622. By way of example, the host network 630 may provide limitations regarding where (i.e., from what geographic locations) the claimant may be authenticated). The verifier 730 may verify the claimant and provide an authentication response to the host network 890. The host network 890, in turn, may forward an access response to the computing device 622.

FIG. 9 is a flowchart illustrating operations in a method to authenticate a claimant, according to embodiments. Referring to FIG. 9, at operation 910 a claimant device determines a physical location of the claimant device. In some embodiments a claimant device 620 may comprise one or more location modules to determine a location of the claimant device 620. By way of example and not limitation, claimant device 620 may include, or be communicatively coupled to, a global positioning system (GPS) module to determine a location based on signals from the global positioning system. Alternatively, or in addition, claimant device 620 may include logic to determine a location based on signals from one or more LEO or MEO satellites 610 as described in one or more of U.S. Pat. Nos. 7,489,926, 7,372,400, 7,579,987, and 7,468,696, the disclosures of which are incorporated herein by reference in their respective entireties. In some embodiments the location of the claimant device 620 may be expressed in latitude/longitude coordinates or another earth-based coordinate system.

At operation 915 the claimant device 620 receives a spot beam transmission from a satellite 610. In some embodiments the claimant device 620 extracts one or more distinctive beam parameters (e.g., time, satellite ID, beam ID, time bias, satellite orbit data, etc.) including a pseudo random code segment from the satellite spot beam. In some embodiments the claimant device 620 may store the beam parameters in a memory module in, or communicatively coupled to, the claimant device 620. In one or more embodiments operation 915 may occur near simultaneously to its preceding operation 910.

At operation 920 the claimant device 620 may continue to generate one or more waypoint data snapshots which may include the location information for the claimant device 620 from operation 910, and one or more of the distinctive beam parameters transmitted via the satellite spot beam as noted in operation 920. In some embodiments the waypoint data snapshots may be stored in a memory module in, or communicatively coupled to, the claimant device 620.

In some embodiments the claimant device 620 may collect an array of waypoint data snapshots over time. For example, an array of waypoint data snapshots may be constructed by receiving spot beams from a plurality of satellites 610 passing over the claimant device 620 over time. Alternatively, or in addition, an array of waypoint data snapshots may be constructed by moving the claimant device 620 in relation to the satellites 610, for example, by placing the claimant device 620 in an aircraft 625 as depicted in FIG. 7B. An additional example would include a claimant device which acts as a tracker to validate the traveled route of an entity or asset which may include dangerous materials. The claimant device may be polled to provide waypoint data to verify the expected path matches that of the actual. The claimant device may be polled randomly.

At operation 920 the waypoint data snapshot(s) are transferred from the claimant device 620 to a verifier device 730. By way of example, in the embodiment depicted in FIG. 7A the waypoint data snapshot(s) may be transmitted via a transmitter 720 or by another communication network. In the embodiment depicted in FIG. 7B the waypoint data snapshot(s) may be transmitted from the aircraft 625 to a satellite 610, then may be transmitted via a satellite network to a verifier device 730.

At operation 925 the verifier device 730 receives location data and waypoint data from the claimant device 620. At operation 930 the verifier device 730 compares the location information and the waypoint data to corresponding data in a known valid data set in order to authenticate the claimant. By way of example, a LEO satellite such as the Iridium satellite constellation circumnavigates the earth in a known orbit, the approximate parameters of which are available well in advance. A verifier device 730 may include a satellite orbit database 864, or be communicatively coupled to a satellite orbit database 864, which includes orbit information about satellites 610 in a known orbit about the earth.

In some embodiments the location data and waypoint data received from the claimant device is compared (operation 930) with location and waypoint data from the known data set to determine whether the claimant device 620 is, in fact, within a reasonable threshold distance of an expected geographic location at an expected time. By way of example and not limitation, the satellite orbit database 864 may be searched for a data record corresponding to the distinctive beam parameters transmitted from the claimant device 620. When a matching record is located, the orbit data from the record retrieved from the orbit database 864 may be compared to the data received from the claimant device 620. For example, the known data may comprise a coordinate for the center of the spot beam 630 and an indication of the radius of the spot beam 630 on the surface of the earth. The coordinates received from the claimant device 620 may be compared to the location of the spot beam to determine whether the received data indicates that the claimant device 620 is within the region circumscribed by the spot beam at the time indicated in the data received from the claimant device. In at least one embodiment, the spot beam may be irregular shaped. In at least one embodiment the claimant device may be at an altitude above the surface of the earth.

If, at operation 935, the data received from the claimant device 620 indicates that the claimant device 620 is within a geographic region encompassed by the spot beam from the satellite 610 at the time associated with the data from the claimant device, then the claimant device 620 may be considered authenticated. In an authentication system, control then passes to operation 940 and the claimant is allowed to access a resource. By way of example and not limitation, the verifier device 730 may grant a token to an authenticated claimant device 620. The token may be used by a remote system to grant access to a resource.

By contrast, if the data received from the claimant device 620 indicates that the claimant device 620 is not within a geographic region encompassed by the spot beam from the satellite 610 at the time associated with the data from the claimant device 620, then the claimant device 620 may not be considered authenticated. In an authentication system, control then passes to operation 945 and the claimant is denied access to a resource. By way of example and not limitation, the verifier device 730 may deny a token to an authenticated claimant device 620. In the absence of a token the claimant device may be denied access to a resource managed by a remote system.

Thus, the system architecture depicted in FIGS. 6-8 and the method depicted in FIG. 9 enable satellite-based authentication of one or more claimant device(s) 620. The authentication system may be used to allow or deny access to one or more resources managed by a remote computing system. In some embodiments the claimant device(s) may be stationary, while in other embodiments the claimant device(s) may be mobile, and the authentication process may be either time-based, location-based, or a combination of both.

In some embodiments the system may be used to implement session-based authentication in which the claimant device(s) 620 are authenticated to use a resource for an entire session. In other embodiments the system may implement message-based authentication in which the claimant device(s) 620 must be authenticated separately for each message transmitted from the claimant device(s) 620 to a remote resource.

In one example implementation, an authentication system as described herein may be used to provide authentication for access to a secure computing resource such as a corporate email system, a corporate network, a military or civil infrastructure network, or an electronic banking facility. In other example implementations, an authentication system may be used to confirm the itinerary of a vehicle in a logistics system. By way of example, a mobile entity such as a truck, train, watercraft or aircraft may comprise one or more claimant device(s) 620. During the course of a scheduled mission a logistics system may periodically poll the claimant device(s) 620, which may respond with authentication data obtained from the satellite 610. The authentication data may be collected in the logistics system and used to confirm that the claimant device(s) are in specific locations at predetermined times in accordance with a logistics plan.

In yet another example, implementation of an authentication system as described herein may be used to verify the location of a claimant device(s) associated with a monitoring system, e.g., a house arrest surveillance system. In such embodiments the claimant device(s) may incorporate one or more biometric sensors such as a fingerprint biometric sensor to authenticate the user of the system, while the authentication system may be used to confirm that the claimant device is in a predetermined location at a predetermined time (i.e., the claimant is in the right place, at the right time, and is the right person). The authentication device may also review the claimant device location against a defined list of approved locations which may also further be refined by the authentication system by reviewing the claimant device's location and time against an approved set of location(s) at an approved time period(s). Furthermore, this system may be used to track registered sex offenders.

In some embodiments the satellite 610 may be part of a LEO satellite system such as the Iridium constellation which orbits the earth in a known orbit and which transmits spot beams having a known geometry, such that a claimant device(s) may be authenticated by confirming that the claimant device is within a designated spot beam at a designated time. Thus, a claimant may be authenticated using a single signal source (e.g., a single satellite 610). Also because LEO satellites such as the Iridium constellation and MEO satellites transmit a relatively high power signal levels the system may be used to authenticate one or more claimant device(s) which are located in an obstructed environment, e.g., indoors or in urban locations. Also, the relatively high signal strength of LEO satellites and MEO satellites leaves these signals less susceptible to jamming efforts.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for a network topology aided by a smart agent download, the method comprising:
   authenticating, with at least one authenticator device, at least one claimant;
   transmitting, by at least one transmission source, the smart agent download to at least one receiving source associated with the at least one claimant;
   receiving, by the at least one receiving source, the smart agent download;
   executing, by at least one processor, the smart agent download; and
   monitoring, by the smart agent download, for anomalous network behavior related to cyber security,
   wherein the at least one authenticator device authenticates the at least one claimant by verifying a location of the at least one claimant by using geolocation techniques, which use random liveness information from at least one secure spot beam based authentication signal to derive at least one secret authentication key, in order to obtain the location of the at least one claimant.

2. The method of claim 1, wherein the at least one secure spot beam based authentication signal is transmitted by the at least one transmission source, and is received by the at least one receiving source.

3. The method of claim 1, wherein the at least one secure spot beam based authentication signal and the smart agent download are transmitted from a same transmission source.

4. The method of claim 1, wherein the at least one secure spot beam based authentication signal and the smart agent download are transmitted from different transmission sources.

5. The method of claim 1, wherein the at least one secure spot beam based authentication signal and the smart agent download are transmitted on a same frequency.

6. The method of claim 1, wherein the at least one secure spot beam based authentication signal and the smart agent download are transmitted on different frequencies.

7. The method of claim 1, wherein the at least one claimant is at least one of an entity and a user.

8. The method of claim 1, wherein the at least one transmission source is employed in at least one of at least one satellite and at least one pseudo-satellite.

9. The method of claim 8, wherein the at least one satellite is at least one of a Lower Earth Orbiting (LEO) satellite, a Medium Earth Orbiting (MEO) satellite, and a Geosynchronous Earth Orbiting (GEO) satellite.

10. The method of claim 1, wherein the claimant is at least one of stationary and mobile.

11. The method of claim 1, wherein the method further comprises storing the smart agent download in memory.

12. The method of claim 1, wherein the monitoring for anomalous network behavior related to cyber security includes at least one of:
   monitoring usage of at least one device associated with the at least one claimant,
   monitoring location of the at least one device;
   monitoring users on the network;
   monitoring data passing through the network; and
   monitoring quantity of the data passing through the network.

13. The method of claim 1, wherein the method further comprises:
   evaluating, by the at least one processor, the network behavior; and
   triggering a specific task to be executed when the processor determines an anomaly in the network behavior has occurred.

14. The method of claim 1, wherein the method further comprises:
   transmitting, by a transmission device associated with the at least one claimant, the network behavior to a network operations center;
   evaluating, by at least one processor at the network operations center, the network behavior; and
   triggering a specific task to be executed when the at least one processor at the network operations center determines an anomaly in the network behavior has occurred.

15. A system for a network topology aided by a smart agent download, the system comprising:
   at least one authenticator device to authenticate at least one claimant;
   at least one transmission source to transmit the smart agent download to at least one receiving source associated with the at least one claimant;
   at least one receiving source to receive the smart agent download; and
   at least one processor to execute the smart agent download,
   wherein the smart agent download, when executed, is to monitor for anomalous network behavior related to cyber security,
   wherein the at least one authenticator device is configured to authenticate the at least one claimant by verifying a location of the at least one claimant by using geolocation techniques, which use random liveness information from at least one secure spot beam based authentication signal to derive at least one secret authentication key, in order to obtain the location of the at least one claimant.

16. The system of claim 15, wherein the at least one secure spot beam based authentication signal is transmitted by the at least one transmission source, and is received by the at least one receiving source.

17. The system of claim 15, wherein the at least one transmission source is employed in at least one of at least one satellite and at least one pseudo-satellite.

18. The system of claim 17, wherein the at least one satellite is at least one of a Lower Earth Orbiting (LEO) satellite, a Medium Earth Orbiting (MEO) satellite, and a Geosynchronous Earth Orbiting (GEO) satellite.

19. The system of claim 15, wherein, to monitor for anomalous network behavior, the smart agent download is configured for at least one of:
   to monitor usage of at least one device associated with the at least one claimant,
   to monitor location of the at least one device;
   to monitor users on the network;
   to monitor data passing through the network; and
   to monitor quantity of the data passing through the network.

20. The system of claim 15, wherein the at least one processor is also to evaluate the network behavior, and
   the smart agent download is also to trigger a specific task to be executed when the at least one processor determines an anomaly in the network behavior has occurred.

21. The system of claim 15, wherein the system further comprises:

a transmission device associated with the at least one claimant to transmit the network behavior to a network operations center; and at least one processor at the network operations center to evaluate the network behavior, wherein the smart agent download is to trigger a specific task to be executed when the at least one processor at the network operations center determines an anomaly in the network behavior has occurred.

22. An apparatus for a network topology aided by a smart agent download, the apparatus comprising:

at least one authenticator device to authenticate at least one claimant associated with the apparatus;

at least one receiving source to receive the smart agent download;

memory to store the smart agent download; and at least one processor to execute the smart agent download, wherein the smart agent download, when executed, is to monitor for anomalous network behavior related to cyber security, wherein the at least one authenticator device is configured to authenticate the at least one claimant by verifying a location of the at least one claimant by using geolocation techniques, which use random liveness information from at least one secure spot beam based authentication signal to derive at least one secret authentication key, in order to obtain the location of the at least one claimant.

23. The apparatus of claim 22, wherein the apparatus further comprises a transmission source to transmit the network behavior.

* * * * *